United States Patent
Shotan et al.

(10) Patent No.: US 12,085,678 B1
(45) Date of Patent: Sep. 10, 2024

(54) METHODS FOR LOCALIZING LIGHT DETECTION AND RANGING (LIDAR) CALIBRATION TARGETS

(71) Applicant: Waymo LLC, Mountain View, CA (US)

(72) Inventors: Gil Shotan, Mountain View, CA (US); Colin Braley, Mountain View, CA (US); Volker Grabe, Mountain View, CA (US); Volodymyr Ivanchenko, Mountain View, CA (US)

(73) Assignee: Waymo LLC, Mountain View, CA (US)

( * ) Notice: Subject to any disclaimer, the term of this patent is extended or adjusted under 35 U.S.C. 154(b) by 926 days.

(21) Appl. No.: 17/138,180

(22) Filed: Dec. 30, 2020

(51) Int. Cl.
| | |
|---|---|
| *G01S 7/497* | (2006.01) |
| *G01S 7/481* | (2006.01) |
| *G01S 17/894* | (2020.01) |
| *G05D 1/00* | (2024.01) |
| *G08G 1/00* | (2006.01) |
| *B60W 50/06* | (2006.01) |
| *B60W 60/00* | (2020.01) |

(52) U.S. Cl.
CPC ............ *G01S 7/497* (2013.01); *G01S 7/4817* (2013.01); *G01S 17/894* (2020.01); *G05D 1/0291* (2013.01); *G08G 1/22* (2013.01); *B60W 50/06* (2013.01); *B60W 60/001* (2020.02); *B60W 2420/403* (2013.01); *B60W 2420/408* (2024.01)

(58) Field of Classification Search
None
See application file for complete search history.

(56) References Cited

U.S. PATENT DOCUMENTS

| 8,355,118 B2 | 1/2013 | Ogawa et al. |
| 10,048,379 B2 | 8/2018 | Markendorf et al. |
| 10,176,596 B1 * | 1/2019 | Mou ............... G06V 10/44 |

(Continued)

OTHER PUBLICATIONS

"What is a Lambertian Surface?" dated Oct. 8, 2014 retrieved from website https://www.azooptics.com/Article.aspx?ArticleID=790 on Feb. 9, 2024. (Year: 2014).*

(Continued)

*Primary Examiner* — Eric L Bolda
(74) *Attorney, Agent, or Firm* — McDonnell Boehnen Hulbert & Berghoff LLP

(57) ABSTRACT

Example embodiments relate to methods for localizing light detection and ranging (lidar) calibration targets. An example method includes generating a point cloud of a region based on data from a light detection and ranging (lidar) device. The point cloud may include points representing at least a portion of a calibration target. The method also includes determining a presumed location of the calibration target. Further, the method includes identifying, within the point cloud, a location of a first edge of the calibration target. In addition, the method includes performing a comparison between the identified location of the first edge of the calibration target and a hypothetical location of the first edge of the calibration target within the point cloud if the calibration target were positioned at the presumed location. Still further, the method includes revising the presumed location of the calibration target based on at least the comparison.

20 Claims, 18 Drawing Sheets

(56) References Cited

U.S. PATENT DOCUMENTS

| | | | |
|---|---|---|---|
| 2008/0236568 A1* | 10/2008 | Hickerson | F24S 30/452 |
| | | | 126/578 |
| 2016/0291155 A1* | 10/2016 | Nehmadi | G05D 1/0088 |
| 2018/0038694 A1 | 2/2018 | Bruemmer et al. | |
| 2018/0190046 A1* | 7/2018 | Levinson | G01S 7/4972 |
| 2019/0122386 A1* | 4/2019 | Wheeler | G01S 17/86 |
| 2019/0145769 A1* | 5/2019 | Sasaki | G01C 3/08 |
| | | | 356/4.01 |
| 2019/0170865 A1 | 6/2019 | Sasaki | |
| 2022/0244395 A1* | 8/2022 | Chen | G01S 7/003 |

OTHER PUBLICATIONS

"Extrinsic 6DoF Calibration of a Radar—LiDAR—Camera System Enhanced by Radar Cross Section Estimates Evaluation"; Juraj Persic, et al.; Robotics and Autonomous Systems (Nov. 5, 2018).

\* cited by examiner

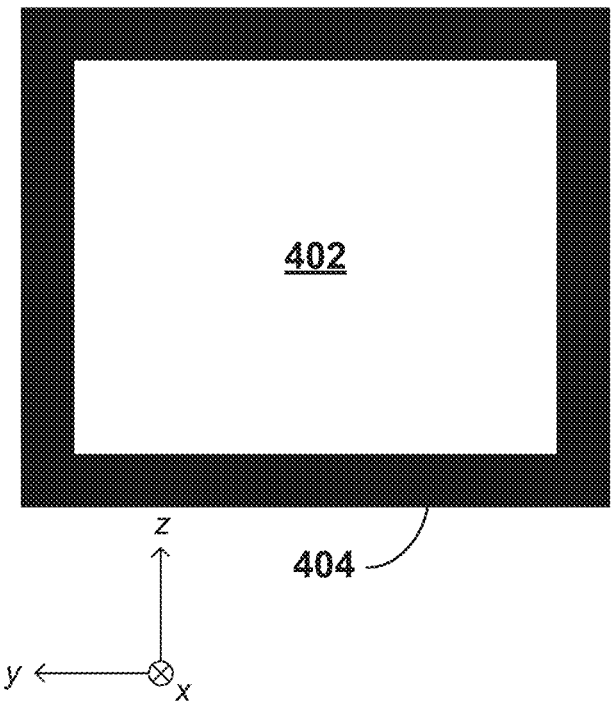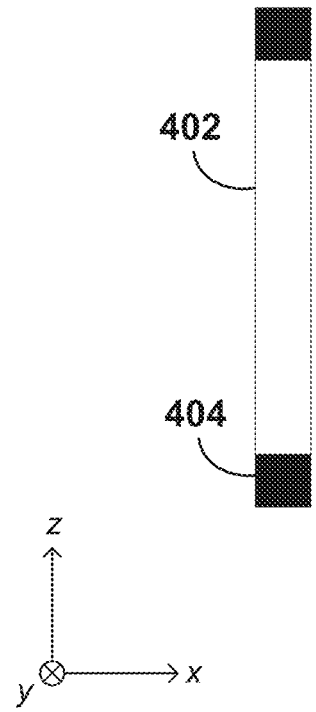
FIG. 5A  FIG. 5B
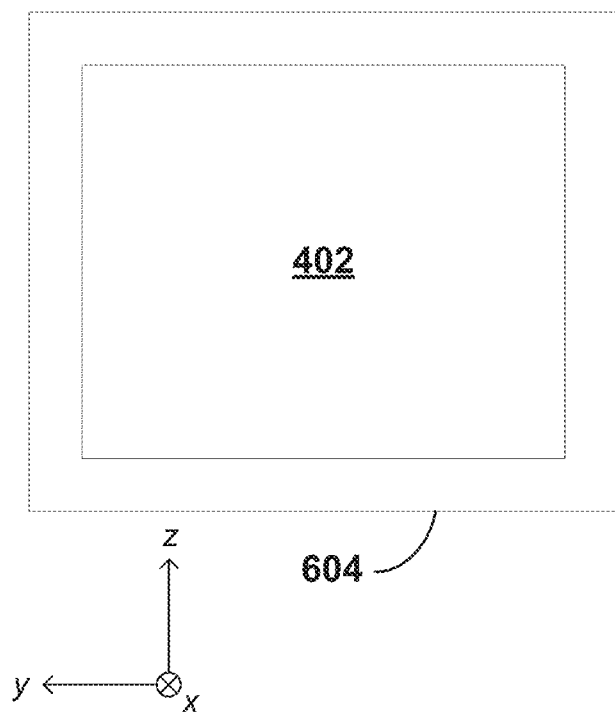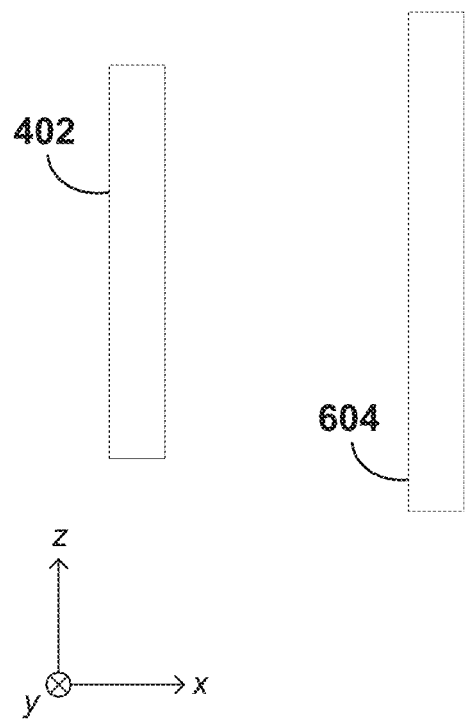
FIG. 6A  FIG. 6B

METHODS FOR LOCALIZING LIGHT DETECTION AND RANGING (LIDAR) CALIBRATION TARGETS

BACKGROUND

Unless otherwise indicated herein, the materials described in this section are not prior art to the claims in this application and are not admitted to be prior art by inclusion in this section.

Light detection and ranging (lidar) devices may estimate distances to objects in a given environment. For example, an emitter subsystem of a lidar device may emit near-infrared light pulses, which may interact with objects in the device's environment. At least a portion of the light pulses may be redirected back toward the lidar (e.g., due to reflection or scattering) and detected by a detector subsystem. Conventional detector subsystems may include a plurality of detectors and a corresponding controller configured to determine an arrival time of the respective light pulses with high temporal resolution (e.g., ~400 ps). The distance between the lidar device and a given object may be determined based on a time of flight of the corresponding light pulses that interact with the given object.

However, to improve the precision with which a lidar device determines distances to objects within a scene, the lidar device may be calibrated. Such a calibration can provide a correlation of the appearance of a measured time delay, an apparent distance to an object, and an actual distance to an object. Further, calibration can correct for defects in the fabrication and/or assembly of a lidar device. For example, if a lens of a lidar device has one or more defects such that an intensity of a transmitted signal and/or reflected signal is reduced upon being transmitted through the lens, a calibration can allow this to be accounted for in run-time (e.g., using a processor that provides a correction to measurements such that they more accurately reflect a physical scene).

SUMMARY

This disclosure relates to methods of localizing a lidar calibration target. Example methods may take an approximate location for the lidar calibration target as an input. The approximate location may be used as a presumed location of the lidar calibration target. A lidar device may then generate a point cloud of a region. The point cloud of the region may include the presumed location of the lidar calibration target. In some implementations, the method may determine whether the lidar calibration target can be detected within the point cloud. The presumed location of the calibration target may be revised based on an apparent location of the lidar calibration target within the point cloud if the apparent location does not match a hypothetical location of the lidar calibration target within the point cloud. The hypothetical location of the lidar calibration target within the point cloud represents the location the lidar calibration target would have within the point cloud if the lidar calibration target were actually located at the presumed location. The revised location of the lidar calibration target may be used by the lidar device and/or other lidar devices to perform lidar calibrations (e.g., intensity/reflectivity calibrations or distance calibrations for lidar measurements).

In one aspect, a method is provided. The method includes generating a point cloud of a region based on data from a light detection and ranging (lidar) device. The point cloud may include points representing at least a portion of a calibration target. The method also includes determining a presumed location of the calibration target. Further, the method includes identifying, within the point cloud, a location of a first edge of the calibration target. In addition, the method includes performing a comparison between the identified location of the first edge of the calibration target and a hypothetical location of the first edge of the calibration target within the point cloud if the calibration target were positioned at the presumed location. Still further, the method includes revising the presumed location of the calibration target based on at least the comparison.

In another aspect, a method is provided. The method includes transmitting, to a light detection and ranging (lidar) device, a presumed location of a calibration target. The method also includes receiving, from the lidar device, a revised presumed location of the calibration target. The revised presumed location of the calibration target may be determined by generating, using the lidar device, a point cloud of a region, wherein the point cloud includes at least a portion of the calibration target. The revised presumed location of the calibration target may also be determined by identifying, within the point cloud, a location of a first edge of the calibration target. Further, the revised presumed location of the calibration target may be determined by performing a comparison between the identified location of the first edge of the calibration target with a hypothetical location of the first edge of the calibration target within the point cloud if the calibration target were positioned at the presumed location. In addition, the revised presumed location of the calibration target may be determined by generating the revised presumed location of the calibration target based on at least the comparison.

In an additional aspect, a non-transitory, computer-readable medium having instructions stored thereon is provided. The instructions, when executed by a processor, result in a method being performed. The method includes generating a point cloud of a region based on data from a light detection and ranging (lidar) device. The point cloud may include points representing at least a portion of a calibration target. The method also includes determining a presumed location of the calibration target. Further, the method includes identifying, within the point cloud, a location of a first edge of the calibration target. In addition, the method includes performing a comparison between the identified location of the first edge of the calibration target with a hypothetical location of the first edge of the calibration target within the point cloud if the calibration target were positioned at the presumed location. Yet further, the method includes revising the presumed location of the calibration target based on at least the comparison.

These as well as other aspects, advantages, and alternatives will become apparent to those of ordinary skill in the art by reading the following detailed description, with reference, where appropriate, to the accompanying drawings.

BRIEF DESCRIPTION OF THE DRAWINGS

FIG. 5A is a front-view illustration of a lidar calibration target and a background, according to example embodiments.

FIG. 5B is a side-view illustration of a lidar calibration target and a background, according to example embodiments.

FIG. 6A is a front-view illustration of a lidar calibration target and a background, according to example embodiments.

FIG. 6B is a side-view illustration of a lidar calibration target and a background, according to example embodiments.

DETAILED DESCRIPTION

Figure 1:
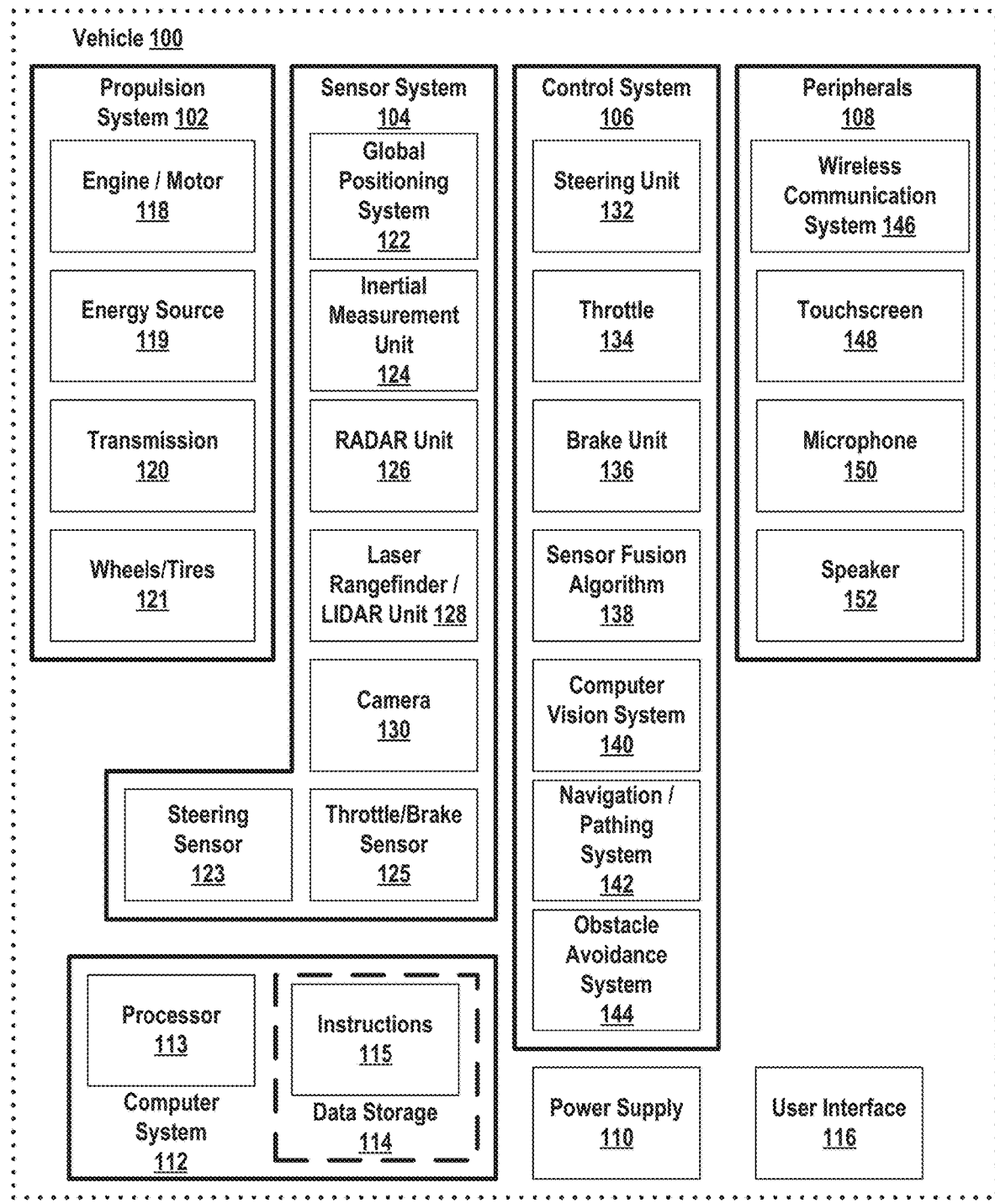
FIG. 1 is a functional block diagram illustrating a vehicle, according to example embodiments.
Figure 2A:
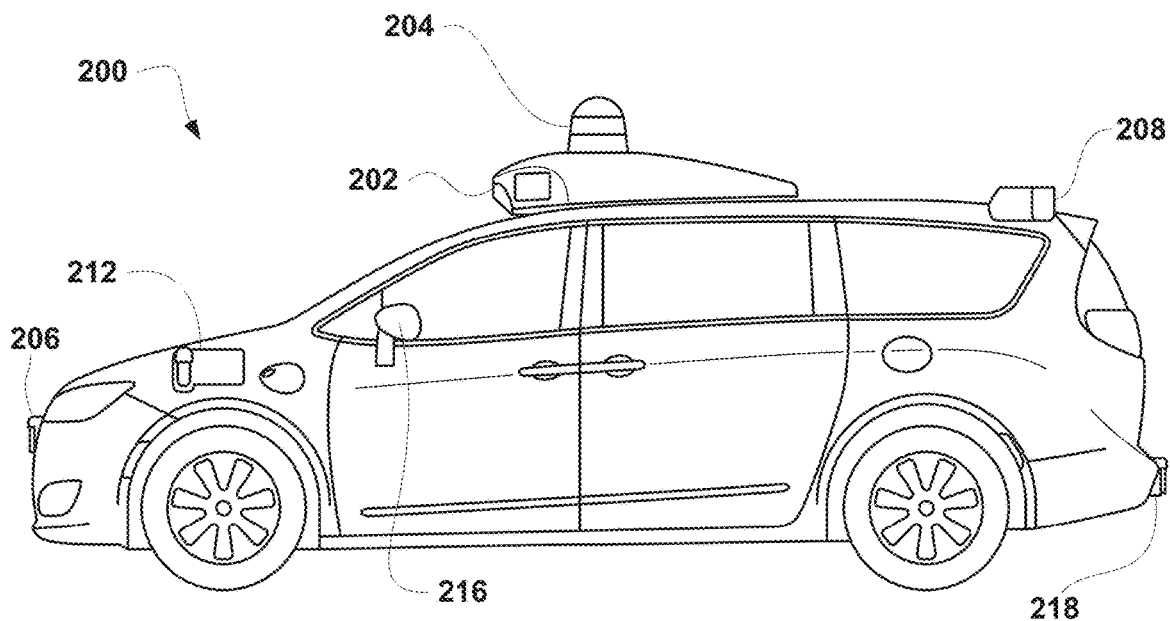
FIG. 2A is an illustration of a physical configuration of a vehicle, according to example embodiments.
Figure 2B:
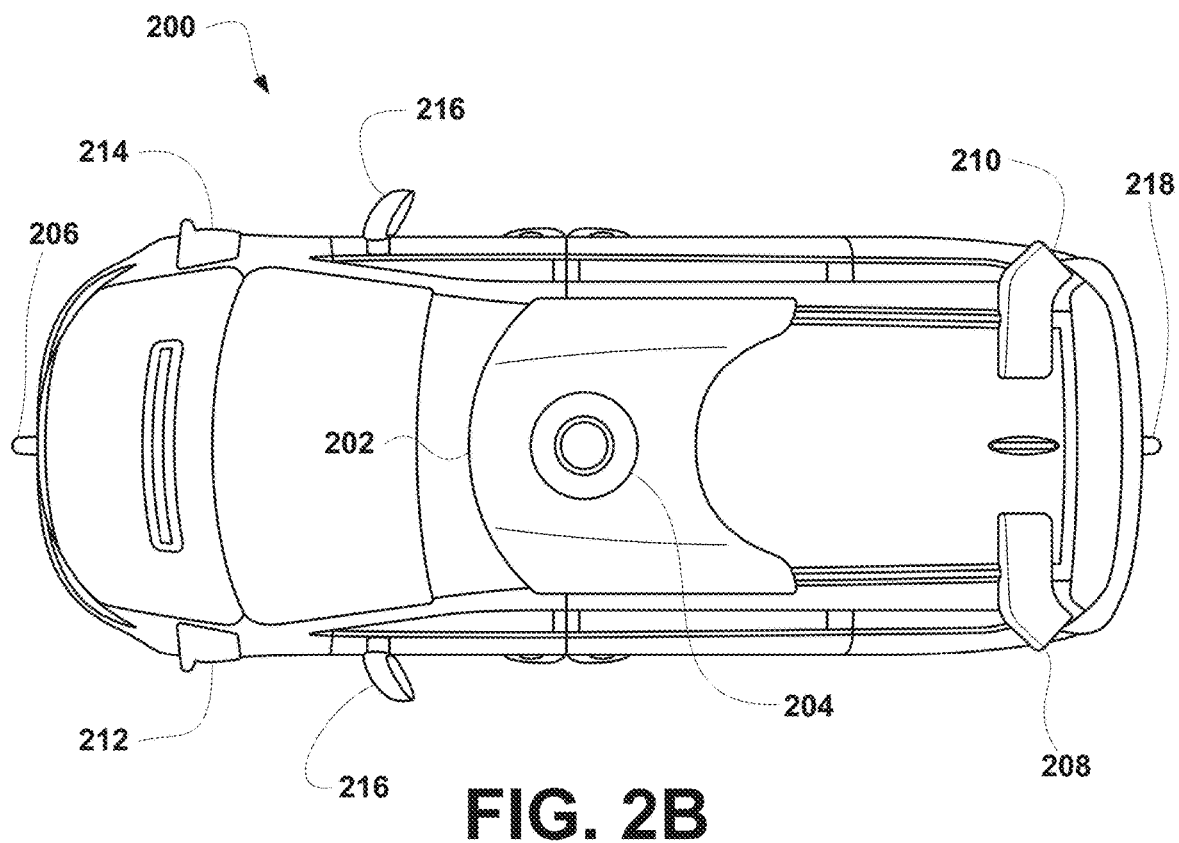
FIG. 2B is an illustration of a physical configuration of a vehicle, according to example embodiments.
Figure 2C:
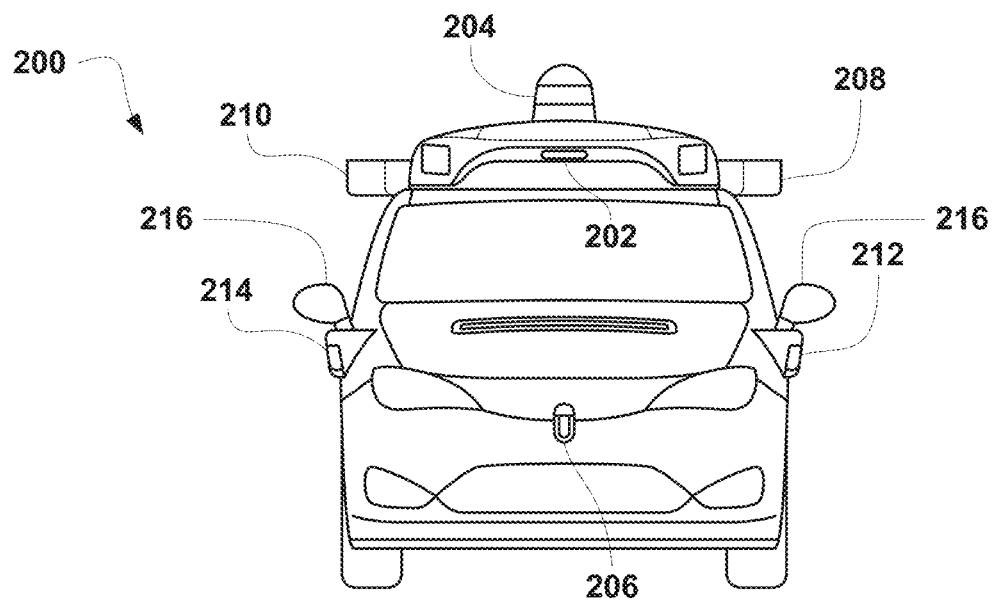
FIG. 2C is an illustration of a physical configuration of a vehicle, according to example embodiments.
Figure 2D:
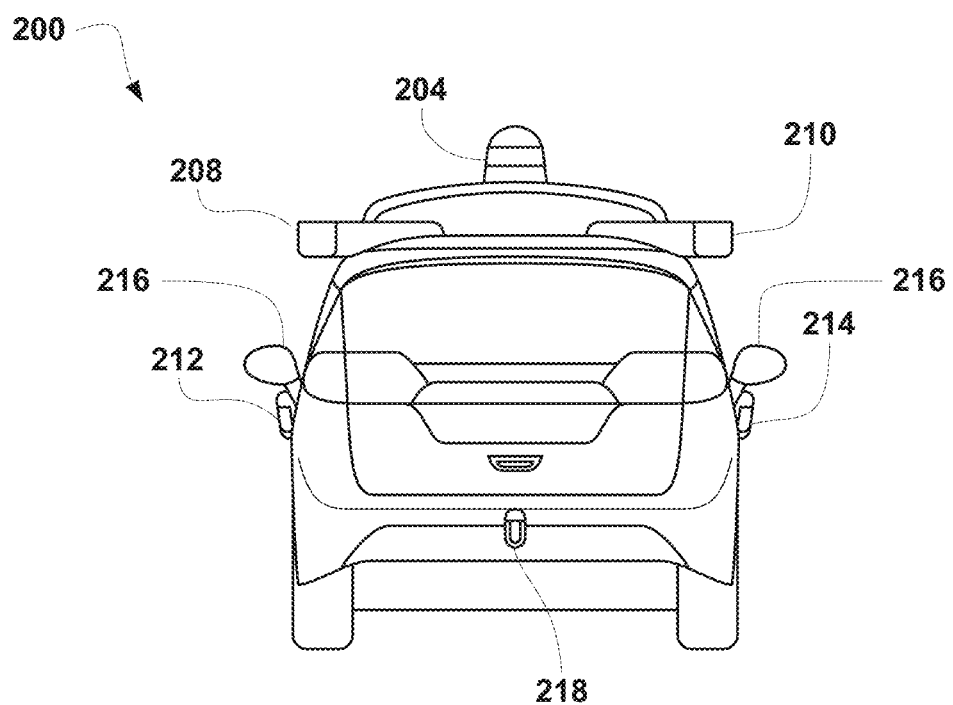
FIG. 2D is an illustration of a physical configuration of a vehicle, according to example embodiments.
Figure 2E:
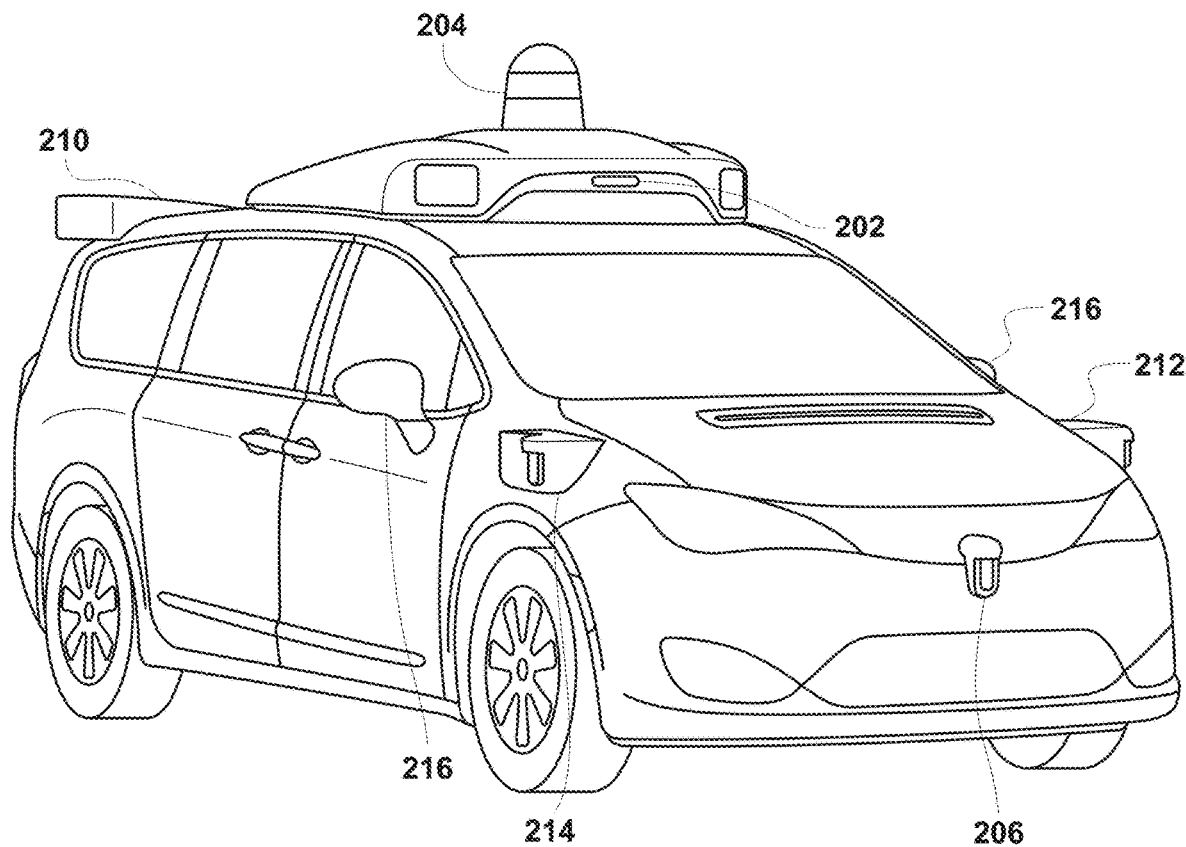
FIG. 2E is an illustration of a physical configuration of a vehicle, according to example embodiments.

Example methods and systems are contemplated herein. Any example embodiment or feature described herein is not necessarily to be construed as preferred or advantageous over other embodiments or features. The example embodiments described herein are not meant to be limiting. It will be readily understood that certain aspects of the disclosed systems and methods can be arranged and combined in a wide variety of different configurations, all of which are contemplated herein.

Furthermore, the particular arrangements shown in the figures should not be viewed as limiting. It should be understood that other embodiments might include more or less of each element shown in a given figure. Further, some of the illustrated elements may be combined or omitted. Yet further, an example embodiment may include elements that are not illustrated in the figures.

I. Overview

Lidar devices (e.g., lidar devices for use in object detection and avoidance for an autonomous vehicle) may determine the range to a given object in a surrounding environment by determining the time of flight of a light signal. In some embodiments, the transmitted light signal may be a light pulse (e.g., emitted from a pulsed laser source). Determining the time of flight of the corresponding light pulses may include determining a time difference between the emit time when the light pulse is emitted from the lidar device and the detect time when a reflection of the light pulse from an object is detected by the lidar device.

In addition to determining distances to a given object in a surrounding environment, lidar devices may make determinations about the reflectivity of objects. Determined reflectivities of objects can assist in object identification (e.g., by identifying the surface profile of the object and/or the color of the object). Hence, more accurate reflectivity measurements can lead to more accurate object identification. In order to enhance the accuracy of distance measurements and/or reflectivity measurements, however, a lidar device may need to undergo calibration.

One technique for calibrating a lidar device may include positioning a lidar calibration target (e.g., having a predetermined reflectivity) at a predetermined distance relative to the lidar device. Once the calibration target is in position, one or more calibration signals may be emitted from one or more light emitters of the lidar device toward the lidar calibration target. Then, the one or more calibration signals may reflect from the calibration target and be detected by one or more detectors of the lidar device. A controller may then compare a known reflectivity of the lidar calibration target to the apparent reflectivity of the lidar calibration target (e.g., as detected by the lidar device) and/or compare a known distance of the lidar calibration target to the apparent distance of the lidar calibration target (e.g., as detected by the lidar device). In some implementations, the known reflectivity and distance may be previously determined by the controller using a calibrated lidar device or may be received from another device, such as another lidar device, a mobile computing device (e.g., a tablet or a mobile phone), or another computing device (e.g., a fleet management server that manages a fleet of lidar devices). Any discrepancies can be stored as offsets that could be used in runtime (e.g., a plot of actual distance vs. apparent distance between the lidar device and the target could be generated and stored in a lookup table that could be used to determine actual distances based on apparent distances in runtime). A separate set of offsets may be generated for each light emitter and/or detector in the lidar device (e.g., for each light emitter/detector pair in lidar devices with corresponding arrays of light emitters and detectors). Further, interpolation, extrapolation, and/or regression techniques may be used to generate the sets of offsets.

One potential challenge with the calibration technique described above is calibrating for long distances. For example, it may be beneficial to confirm that a lidar device can detect an object with at least a threshold reflectivity at at least a threshold range (e.g., as a safety precaution within an autonomous vehicle). For example, being able to detect an object with at least a x % reflectivity (e.g., 50%) at at least a 200 m range may be beneficial. Calibrating for long distances naturally calls for large separations between the lidar device and the calibration target (e.g., in order to calibrate for runtime detections at ranges of 200 m, a 200 meter separation between the lidar device and the calibration target may be used). However, at such distances even relatively minor angular misalignments of the lidar device relative to the expected location of lidar calibration target (e.g., angular misalignments of 1°-3°) may result in the lidar device capturing data that can be represented as a point cloud (sometimes herein referred to as a point cloud for convenience) that does not include the lidar calibration target or includes the lidar calibration target in a location within the point cloud at which a computing device analyzing the point cloud will not be expecting it to be. Further, in some cases, the lidar calibration target may be occluded or non-existent (e.g., the lidar calibration target may have moved) and therefore the computing device may not be able to detect the lidar calibration target. This may result in the point cloud being unusable for calibration. Hence, it may be important to have the lidar calibration target precisely localized so that the lidar device can be accurately aligned prior to attempting to generate a point cloud to be used for calibration.

Described herein are techniques for localizing a lidar calibration target. The lidar calibration target may be localized based on an independent localization measurement and/or a measurement that is used both for calibration and localization. For example, a point cloud of the lidar calibration target may be generated for calibration using a lidar device and then the point cloud may be used to further localize the lidar calibration target and to calibrate the lidar device. In some embodiments, the point cloud may be generated by the lidar device by making measurements of a portion of a surrounding environment based on a presumed location of the lidar calibration target. The presumed location of the lidar calibration target may be transmitted to the lidar device (or a vehicle associated with the lidar device) by another lidar device, a mobile computing device (e.g., a tablet or a mobile phone), or another computing device (e.g., a fleet management server that manages a fleet of lidar devices). Alternatively, the presumed location of the lidar calibration target used by the lidar device may be based on a previous calibration or localization procedure performed by the lidar device. The presumed location may correspond to an approximated location of the lidar calibration target, for example.

After generating the point cloud, the point cloud may be analyzed to revise the presumed location of the lidar calibration target (e.g., for use in future localizations or future calibrations by the lidar device or other lidar devices). For example, a controller corresponding to the lidar device, a controller corresponding to a vehicle associated with the lidar device, and/or a fleet management server may analyze the point cloud to revise the presumed location. Analyzing the point cloud may include determining a hypothetical location of a surface of the lidar calibration target (e.g., a center of the surface of the lidar calibration target and/or an edge of the surface of the lidar calibration target) within the point cloud if the lidar calibration target were actually located at the presumed location. This hypothetical location may be compared to the actual location of the surface of the lidar calibration target (e.g., the center of the surface of the lidar calibration target or the edge of the surface of the lidar calibration target) within the point cloud. An offset representing the difference between the hypothetical location and the actual location may then be used to revise the presumed location (e.g., to enhance future calibrations and/or future localizations). The revised presumed location may be stored within a memory associated with the lidar device and/or a memory associated with a vehicle corresponding to the lidar device. Additionally or alternatively, the revised presumed location may be transmitted to another lidar device and/or another vehicle within a fleet. In some embodiments, the revised presumed location may be transmitted to a fleet management server, stored within a memory associated with the fleet management server, and/or disseminated to other lidar devices in the fleet by the fleet management server.

II. Example Systems

The following description and accompanying drawings will elucidate features of various example embodiments. The embodiments provided are by way of example, and are not intended to be limiting. As such, the dimensions of the drawings are not necessarily to scale.

Example systems within the scope of the present disclosure will now be described in greater detail. An example system may be implemented in or may take the form of an automobile. Additionally, an example system may also be implemented in or take the form of various vehicles, such as cars, trucks, motorcycles, buses, boats, airplanes, helicopters, lawn mowers, earth movers, boats, snowmobiles, aircraft, recreational vehicles, amusement park vehicles, farm equipment, construction equipment, trains, golf carts, trains, trolleys, and robot devices. Other vehicles are possible as well. Further, in some embodiments, example systems might not include a vehicle.

Referring now to the figures, FIG. 1 is a functional block diagram illustrating example vehicle 100, which may be configured to operate fully or partially in an autonomous mode. More specifically, vehicle 100 may operate in an autonomous mode without human interaction through receiving control instructions from a computing system. As part of operating in the autonomous mode, vehicle 100 may use sensors to detect and possibly identify objects of the surrounding environment to enable safe navigation. In some embodiments, vehicle 100 may also include subsystems that enable a driver to control operations of vehicle 100.

As shown in FIG. 1, vehicle 100 may include various subsystems, such as propulsion system 102, sensor system 104, control system 106, one or more peripherals 108, power supply 110, computer system 112 (could also be referred to as a computing system), data storage 114, and user interface 116. In other examples, vehicle 100 may include more or fewer subsystems, which can each include multiple elements. The subsystems and components of vehicle 100 may be interconnected in various ways. In addition, functions of vehicle 100 described herein can be divided into additional functional or physical components, or combined into fewer functional or physical components within embodiments. For instance, the control system 106 and the computer system 112 may be combined into a single system that operates the vehicle 100 in accordance with various operations.

Propulsion system 102 may include one or more components operable to provide powered motion for vehicle 100 and can include an engine/motor 118, an energy source 119, a transmission 120, and wheels/tires 121, among other possible components. For example, engine/motor 118 may be configured to convert energy source 119 into mechanical energy and can correspond to one or a combination of an internal combustion engine, an electric motor, steam engine, or Stirling engine, among other possible options. For instance, in some embodiments, propulsion system 102 may include multiple types of engines and/or motors, such as a gasoline engine and an electric motor.

Energy source 119 represents a source of energy that may, in full or in part, power one or more systems of vehicle 100 (e.g., engine/motor 118). For instance, energy source 119 can correspond to gasoline, diesel, other petroleum-based fuels, propane, other compressed gas-based fuels, ethanol, solar panels, batteries, and/or other sources of electrical power. In some embodiments, energy source 119 may include a combination of fuel tanks, batteries, capacitors, and/or flywheels.

Transmission 120 may transmit mechanical power from engine/motor 118 to wheels/tires 121 and/or other possible systems of vehicle 100. As such, transmission 120 may include a gearbox, a clutch, a differential, and a drive shaft, among other possible components. A drive shaft may include axles that connect to one or more wheels/tires 121.

Wheels/tires 121 of vehicle 100 may have various configurations within example embodiments. For instance, vehicle 100 may exist in a unicycle, bicycle/motorcycle, tricycle, or car/truck four-wheel format, among other possible configurations. As such, wheels/tires 121 may connect to vehicle 100 in various ways and can exist in different materials, such as metal and rubber.

Sensor system 104 can include various types of sensors, such as GPS 122, inertial measurement unit (IMU) 124, radar 126, laser rangefinder/lidar 128, camera 130, steering sensor 123, and throttle/brake sensor 125, among other possible sensors. In some embodiments, sensor system 104 may also include sensors configured to monitor internal systems of the vehicle 100 (e.g., $O_2$ monitor, fuel gauge, engine oil temperature, brake wear).

GPS 122 may include a transceiver operable to provide information regarding the position of vehicle 100 with respect to the Earth. IMU 124 may have a configuration that uses one or more accelerometers and/or gyroscopes and may sense position and orientation changes of vehicle 100 based on inertial acceleration. For example, IMU 124 may detect a pitch and yaw of the vehicle 100 while vehicle 100 is stationary or in motion.

Radar 126 may represent one or more systems configured to use radio signals to sense objects, including the speed and heading of the objects, within the local environment of vehicle 100. As such, radar 126 may include antennas configured to transmit and receive radio signals. In some embodiments, radar 126 may correspond to a mountable radar system configured to obtain measurements of the surrounding environment of vehicle 100.

Laser rangefinder/lidar 128 may include one or more laser sources, a laser scanner, and one or more detectors, among other system components, and may operate in a coherent mode (e.g., using heterodyne detection) or in an incoherent detection mode. In some embodiments, the one or more detectors of the laser rangefinder/lidar 128 may include one or more photodetectors. Such photodetectors may be especially sensitive detectors (e.g., avalanche photodiodes (APDs)). In some examples, such photodetectors may be capable of detecting single photons (e.g., single-photon avalanche diodes (SPADs)). Further, such photodetectors can be arranged (e.g., through an electrical connection in series) into an array (e.g., as in a SiPM). In some examples, the one or more photodetectors are Geiger-mode operated devices and the lidar includes subcomponents designed for such Geiger-mode operation.

Camera 130 may include one or more devices (e.g., still camera or video camera) configured to capture images of the environment of vehicle 100.

Steering sensor 123 may sense a steering angle of vehicle 100, which may involve measuring an angle of the steering wheel or measuring an electrical signal representative of the angle of the steering wheel. In some embodiments, steering sensor 123 may measure an angle of the wheels of the vehicle 100, such as detecting an angle of the wheels with respect to a forward axis of the vehicle 100. Steering sensor 123 may also be configured to measure a combination (or a subset) of the angle of the steering wheel, electrical signal representing the angle of the steering wheel, and the angle of the wheels of vehicle 100.

Throttle/brake sensor 125 may detect the position of either the throttle position or brake position of vehicle 100. For instance, throttle/brake sensor 125 may measure the angle of both the gas pedal (throttle) and brake pedal or may measure an electrical signal that could represent, for instance, an angle of a gas pedal (throttle) and/or an angle of a brake pedal. Throttle/brake sensor 125 may also measure an angle of a throttle body of vehicle 100, which may include part of the physical mechanism that provides modulation of energy source 119 to engine/motor 118 (e.g., a butterfly valve or carburetor). Additionally, throttle/brake sensor 125 may measure a pressure of one or more brake pads on a rotor of vehicle 100 or a combination (or a subset) of the angle of the gas pedal (throttle) and brake pedal, electrical signal representing the angle of the gas pedal (throttle) and brake pedal, the angle of the throttle body, and the pressure that at least one brake pad is applying to a rotor of vehicle 100. In other embodiments, throttle/brake sensor 125 may be configured to measure a pressure applied to a pedal of the vehicle, such as a throttle or brake pedal.

Control system 106 may include components configured to assist in navigating vehicle 100, such as steering unit 132, throttle 134, brake unit 136, sensor fusion algorithm 138, computer vision system 140, navigation/pathing system 142, and obstacle avoidance system 144. More specifically, steering unit 132 may be operable to adjust the heading of vehicle 100, and throttle 134 may control the operating speed of engine/motor 118 to control the acceleration of vehicle 100. Brake unit 136 may decelerate vehicle 100, which may involve using friction to decelerate wheels/tires 121. In some embodiments, brake unit 136 may convert kinetic energy of wheels/tires 121 to electric current for subsequent use by a system or systems of vehicle 100.

Sensor fusion algorithm 138 may include a Kalman filter, Bayesian network, or other algorithms that can process data from sensor system 104. In some embodiments, sensor fusion algorithm 138 may provide assessments based on incoming sensor data, such as evaluations of individual objects and/or features, evaluations of a particular situation, and/or evaluations of potential impacts within a given situation.

Computer vision system 140 may include hardware and software operable to process and analyze images in an effort to determine objects, environmental objects (e.g., traffic lights, roadway boundaries, etc.), and obstacles. As such, computer vision system 140 may use object recognition, Structure From Motion (SFM), video tracking, and other algorithms used in computer vision, for instance, to recognize objects, map an environment, track objects, estimate the speed of objects, etc.

Navigation/pathing system 142 may determine a driving path for vehicle 100, which may involve dynamically adjusting navigation during operation. As such, navigation/pathing system 142 may use data from sensor fusion algorithm 138, GPS 122, and maps, among other sources to navigate vehicle 100. Obstacle avoidance system 144 may evaluate potential obstacles based on sensor data and cause systems of vehicle 100 to avoid or otherwise negotiate the potential obstacles.

As shown in FIG. 1, vehicle 100 may also include peripherals 108, such as wireless communication system 146, touchscreen 148, microphone 150, and/or speaker 152. Peripherals 108 may provide controls or other elements for a user to interact with user interface 116. For example, touchscreen 148 may provide information to users of vehicle 100. User interface 116 may also accept input from the user via touchscreen 148. Peripherals 108 may also enable vehicle 100 to communicate with devices, such as other vehicle devices.

Wireless communication system 146 may wirelessly communicate with one or more devices directly or via a communication network. For example, wireless communication system 146 could use 3G cellular communication, such as code-division multiple access (CDMA), evolution-data optimized (EVDO), global system for mobile communications (GSM)/general packet radio service (GPRS), or cellular communication, such as 4G worldwide interoperability for microwave access (WiMAX) or long-term evolution (LTE), or 5G. Alternatively, wireless communication system 146 may communicate with a wireless local area network (WLAN) using WIFI® or other possible connections. Wireless communication system 146 may also communicate directly with a device using an infrared link, Bluetooth, or ZigBee, for example. Other wireless protocols, such as various vehicular communication systems, are possible within the context of the disclosure. For example, wireless communication system 146 may include one or more dedicated short-range communications (DSRC) devices that could include public and/or private data communications between vehicles and/or roadside stations.

Vehicle 100 may include power supply 110 for powering components. Power supply 110 may include a rechargeable lithium-ion or lead-acid battery in some embodiments. For instance, power supply 110 may include one or more batteries configured to provide electrical power. Vehicle 100 may also use other types of power supplies. In an example embodiment, power supply 110 and energy source 119 may be integrated into a single energy source.

Vehicle 100 may also include computer system 112 to perform operations, such as operations described therein. As such, computer system 112 may include at least one processor 113 (which could include at least one microprocessor) operable to execute instructions 115 stored in a non-transitory, computer-readable medium, such as data storage 114. In some embodiments, computer system 112 may represent a plurality of computing devices that may serve to control individual components or subsystems of vehicle 100 in a distributed fashion.

In some embodiments, data storage 114 may contain instructions 115 (e.g., program logic) executable by processor 113 to execute various functions of vehicle 100, including those described above in connection with FIG. 1. Data storage 114 may contain additional instructions as well, including instructions to transmit data to, receive data from, interact with, and/or control one or more of propulsion system 102, sensor system 104, control system 106, and peripherals 108.

In addition to instructions 115, data storage 114 may store data such as roadway maps, path information, among other information. Such information may be used by vehicle 100 and computer system 112 during the operation of vehicle 100 in the autonomous, semi-autonomous, and/or manual modes.

Vehicle 100 may include user interface 116 for providing information to or receiving input from a user of vehicle 100. User interface 116 may control or enable control of content and/or the layout of interactive images that could be displayed on touchscreen 148. Further, user interface 116 could include one or more input/output devices within the set of peripherals 108, such as wireless communication system 146, touchscreen 148, microphone 150, and speaker 152.

Computer system 112 may control the function of vehicle 100 based on inputs received from various subsystems (e.g., propulsion system 102, sensor system 104, and control system 106), as well as from user interface 116. For example, computer system 112 may utilize input from sensor system 104 in order to estimate the output produced by propulsion system 102 and control system 106. Depending upon the embodiment, computer system 112 could be operable to monitor many aspects of vehicle 100 and its subsystems. In some embodiments, computer system 112 may disable some or all functions of the vehicle 100 based on signals received from sensor system 104.

The components of vehicle 100 could be configured to work in an interconnected fashion with other components within or outside their respective systems. For instance, in an example embodiment, camera 130 could capture a plurality of images that could represent information about a state of an environment of vehicle 100 operating in an autonomous mode. The state of the environment could include parameters of the road on which the vehicle is operating. For example, computer vision system 140 may be able to recognize the slope (grade) or other features based on the plurality of images of a roadway. Additionally, the combination of GPS 122 and the features recognized by computer vision system 140 may be used with map data stored in data storage 114 to determine specific road parameters. Further, radar 126 may also provide information about the surroundings of the vehicle.

In other words, a combination of various sensors (which could be termed input-indication and output-indication sensors) and computer system 112 could interact to provide an indication of an input provided to control a vehicle or an indication of the surroundings of a vehicle.

In some embodiments, computer system 112 may make a determination about various objects based on data that is provided by systems other than the radio system. For example, vehicle 100 may have lasers or other optical sensors configured to sense objects in a field of view of the vehicle. Computer system 112 may use the outputs from the various sensors to determine information about objects in a field of view of the vehicle, and may determine distance and direction information to the various objects. Computer system 112 may also determine whether objects are desirable or undesirable based on the outputs from the various sensors.

Although FIG. 1 shows various components of vehicle 100 (i.e., wireless communication system 146, computer system 112, data storage 114, and user interface 116) as being integrated into the vehicle 100, one or more of these components could be mounted or associated separately from vehicle 100. For example, data storage 114 could, in part or in full, exist separate from vehicle 100. Thus, vehicle 100 could be provided in the form of device elements that may be located separately or together. The device elements that make up vehicle 100 could be communicatively coupled together in a wired and/or wireless fashion.

FIGS. 2A-2E shows an example vehicle 200 that can include some or all of the functions described in connection with vehicle 100 in reference to FIG. 1. Although vehicle 200 is illustrated in FIGS. 2A-2E as a van for illustrative purposes, the present disclosure is not so limited. For instance, the vehicle 200 can represent a truck, a car, a semi-trailer truck, a motorcycle, a golf cart, an off-road vehicle, a farm vehicle, etc.

The example vehicle 200 includes a sensor unit 202, a first lidar unit 204, a second lidar unit 206, a first radar unit 208, a second radar unit 210, a first lidar/radar unit 212, a second lidar/radar unit 214, and two additional locations 216, 218 at which a radar unit, lidar unit, laser rangefinder unit, and/or other type of sensor or sensor(s) could be located on the vehicle 200. Each of the first lidar/radar unit 212 and the second lidar/radar unit 214 can take the form of a lidar unit, a radar unit, or both.

Furthermore, the example vehicle 200 can include any of the components described in connection with vehicle 100 of FIG. 1. The first and second radar units 208, 210 and/or the first and second lidar units 204, 206 can actively scan the surrounding environment for the presence of potential obstacles and can be similar to the radar 126 and/or laser rangefinder/lidar 128 in the vehicle 100.

The sensor unit 202 is mounted atop the vehicle 200 and includes one or more sensors configured to detect information about an environment surrounding the vehicle 200, and output indications of the information. For example, sensor unit 202 can include any combination of cameras, radars, lidars, range finders, inertial sensors, humidity sensors, and acoustic sensors. The sensor unit 202 can include one or more movable mounts that could be operable to adjust the orientation of one or more sensors in the sensor unit 202. In one embodiment, the movable mount could include a rotating platform that could scan sensors so as to obtain information from each direction around the vehicle 200. In another embodiment, the movable mount of the sensor unit 202 could be movable in a scanning fashion within a particular range of angles and/or azimuths and/or elevations. The sensor unit 202 could be mounted atop the roof of a car, although other mounting locations are possible.

Additionally, the sensors of sensor unit 202 could be distributed in different locations and need not be collocated in a single location. Some possible sensor types and mounting locations include the two additional locations 216, 218. Furthermore, each sensor of sensor unit 202 can be configured to be moved or scanned independently of other sensors of sensor unit 202.

In an example configuration, one or more radar scanners (e.g., first and second radar units 208, 210) can be located near the rear of the vehicle 200, to actively scan the environment near the back of the vehicle 200 for the presence of radio-reflective objects. Similarly, the first lidar/radar unit 212 and the second lidar/radar unit 214 may be mounted near the front of the vehicle 200 to actively scan the environment near the front of the vehicle 200. A radar scanner can be situated, for example, in a location suitable to illuminate a region including a forward-moving path of the vehicle 200 without occlusion by other features of the vehicle 200. For example, a radar scanner can be embedded in and/or mounted in or near the front bumper, front headlights, cowl, and/or hood, etc. Furthermore, one or more additional radar scanning devices can be located to actively scan the side and/or rear of the vehicle 200 for the presence of radio-reflective objects, such as by including such devices in or near the rear bumper, side panels, rocker panels, and/or undercarriage, etc.

Although not shown in FIGS. 2A-2E, the vehicle 200 can include a wireless communication system. The wireless communication system may include wireless transmitters and receivers that could be configured to communicate with devices external or internal to the vehicle 200. Specifically, the wireless communication system could include transceivers configured to communicate with other vehicles and/or computing devices, for instance, in a vehicular communication system or a roadway station. Examples of such vehicular communication systems include DSRC, radio frequency identification (RFID), and other proposed communication standards directed towards intelligent transport systems.

The vehicle 200 can include a camera, possibly at a location inside sensor unit 202. The camera can be a photosensitive instrument, such as a still camera, a video camera, etc., that is configured to capture a plurality of images of the environment of the vehicle 200. To this end, the camera can be configured to detect visible light, and can additionally or alternatively be configured to detect light from other portions of the spectrum, such as infrared or ultraviolet light. The camera can be a two-dimensional detector, and can optionally have a three-dimensional spatial range of sensitivity. In some embodiments, the camera can include, for example, a range detector configured to generate a two-dimensional image indicating distance from the camera to a number of points in the environment. To this end, the camera may use one or more range detecting techniques. For example, the camera can provide range information by using a structured light technique in which the vehicle 200 illuminates an object in the environment with a predetermined light pattern, such as a grid or checkerboard pattern and uses the camera to detect a reflection of the predetermined light pattern from environmental surroundings. Based on distortions in the reflected light pattern, the vehicle 200 can determine the distance to the points on the object. The predetermined light pattern may comprise infrared light, or radiation at other suitable wavelengths for such measurements. In some examples, the camera can be mounted inside a front windshield of the vehicle 200. Specifically, the camera can be situated to capture images from a forward-looking view with respect to the orientation of the vehicle 200. Other mounting locations and viewing angles of the camera can also be used, either inside or outside the vehicle 200. Further, the camera can have associated optics operable to provide an adjustable field of view. Still further, the camera can be mounted to vehicle 200 with a movable mount to vary a pointing angle of the camera, such as via a pan/tilt mechanism.

The vehicle 200 may include one or more other components in addition to or instead of those shown. The additional components may include electrical or mechanical functionality.

A control system of the vehicle 200 may be configured to control the vehicle 200 in accordance with a control strategy from among multiple possible control strategies. The control system may be configured to receive information from sensors coupled to the vehicle 200 (on or off the vehicle 200), modify the control strategy (and an associated driving behavior) based on the information, and control the vehicle 200 in accordance with the modified control strategy. The control system further may be configured to monitor the information received from the sensors, and continuously evaluate driving conditions; and also may be configured to modify the control strategy and driving behavior based on changes in the driving conditions.

Figure 3:
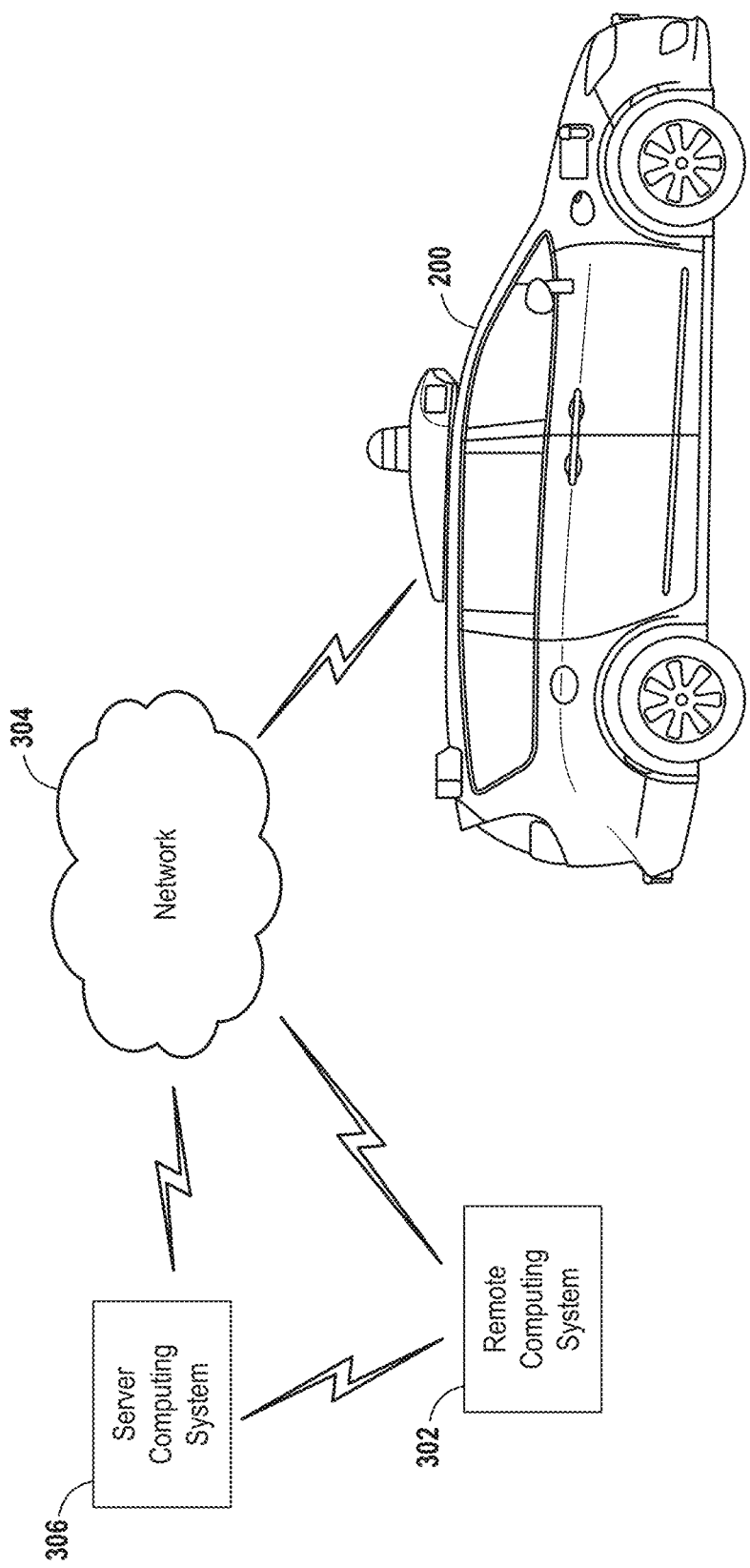
FIG. 3 is a conceptual illustration of wireless communication between various computing systems related to an autonomous vehicle, according to example embodiments.

FIG. 3 is a conceptual illustration of wireless communication between various computing systems related to an autonomous vehicle, according to example embodiments. In particular, wireless communication may occur between remote computing system 302 and vehicle 200 via network 304. Wireless communication may also occur between server computing system 306 and remote computing system 302, and between server computing system 306 and vehicle 200.

Vehicle 200 can correspond to various types of vehicles capable of transporting passengers or objects between locations, and may take the form of any one or more of the vehicles discussed above. In some instances, vehicle 200 may operate in an autonomous mode that enables a control system to safely navigate vehicle 200 between destinations using sensor measurements. When operating in an autonomous mode, vehicle 200 may navigate with or without passengers. As a result, vehicle 200 may pick up and drop off passengers between desired destinations.

Remote computing system 302 may represent any type of device related to remote assistance techniques, including but not limited to those described herein. Within examples, remote computing system 302 may represent any type of device configured to (i) receive information related to vehicle 200, (ii) provide an interface through which a human operator can in turn perceive the information and input a response related to the information, and (iii) transmit the response to vehicle 200 or to other devices. Remote computing system 302 may take various forms, such as a workstation, a desktop computer, a laptop, a tablet, a mobile phone (e.g., a smart phone), and/or a server. In some examples, remote computing system 302 may include multiple computing devices operating together in a network configuration.

Remote computing system 302 may include one or more subsystems and components similar or identical to the subsystems and components of vehicle 200. At a minimum, remote computing system 302 may include a processor configured for performing various operations described herein. In some embodiments, remote computing system 302 may also include a user interface that includes input/output devices, such as a touchscreen and a speaker. Other examples are possible as well.

Network 304 represents infrastructure that enables wireless communication between remote computing system 302 and vehicle 200. Network 304 also enables wireless communication between server computing system 306 and remote computing system 302, and between server computing system 306 and vehicle 200.

The position of remote computing system 302 can vary within examples. For instance, remote computing system 302 may have a remote position from vehicle 200 that has a wireless communication via network 304. In another example, remote computing system 302 may correspond to a computing device within vehicle 200 that is separate from vehicle 200, but with which a human operator can interact while a passenger or driver of vehicle 200. In some examples, remote computing system 302 may be a computing device with a touchscreen operable by the passenger of vehicle 200.

In some embodiments, operations described herein that are performed by remote computing system 302 may be additionally or alternatively performed by vehicle 200 (i.e., by any system(s) or subsystem(s) of vehicle 200). In other words, vehicle 200 may be configured to provide a remote assistance mechanism with which a driver or passenger of the vehicle can interact.

Server computing system 306 may be configured to wirelessly communicate with remote computing system 302 and vehicle 200 via network 304 (or perhaps directly with remote computing system 302 and/or vehicle 200). Server computing system 306 may represent any computing device configured to receive, store, determine, and/or send information relating to vehicle 200 and the remote assistance thereof. As such, server computing system 306 may be configured to perform any operation(s), or portions of such operation(s), that is/are described herein as performed by remote computing system 302 and/or vehicle 200. Some embodiments of wireless communication related to remote assistance may utilize server computing system 306, while others may not.

Server computing system 306 may include one or more subsystems and components similar or identical to the subsystems and components of remote computing system 302 and/or vehicle 200, such as a processor configured for performing various operations described herein, and a wireless communication interface for receiving information from, and providing information to, remote computing system 302 and vehicle 200.

The various systems described above may perform various operations. These operations and related features will now be described.

In line with the discussion above, a computing system (e.g., remote computing system 302, server computing system 306, or a computing system local to vehicle 200) may operate to use a camera to capture images of the environment of an autonomous vehicle. In general, at least one computing system will be able to analyze the images and possibly control the autonomous vehicle.

In some embodiments, to facilitate autonomous operation a vehicle (e.g., vehicle 200) may receive data representing objects in an environment in which the vehicle operates (also referred to herein as "environment data") in a variety of ways. A sensor system on the vehicle may provide the environment data representing objects of the environment. For example, the vehicle may have various sensors, including a camera, a radar unit, a laser range finder, a microphone, a radio unit, and other sensors. Each of these sensors may communicate environment data to a processor in the vehicle about information each respective sensor receives.

In one example, a camera may be configured to capture still images and/or video. In some embodiments, the vehicle may have more than one camera positioned in different orientations. Also, in some embodiments, the camera may be able to move to capture images and/or video in different directions. The camera may be configured to store captured images and video to a memory for later processing by a processing system of the vehicle. The captured images and/or video may be the environment data. Further, the camera may include an image sensor as described herein.

In another example, a radar unit may be configured to transmit an electromagnetic signal that will be reflected by various objects near the vehicle, and then capture electromagnetic signals that reflect off the objects. The captured reflected electromagnetic signals may enable the radar system (or processing system) to make various determinations about objects that reflected the electromagnetic signal. For example, the distances to and positions of various reflecting objects may be determined. In some embodiments, the vehicle may have more than one radar in different orientations. The radar system may be configured to store captured information to a memory for later processing by a processing system of the vehicle. The information captured by the radar system may be environment data.

In another example, a laser range finder may be configured to transmit an electromagnetic signal (e.g., infrared light, such as that from a gas or diode laser, or other possible light source) that will be reflected by target objects near the vehicle. The laser range finder may be able to capture the reflected electromagnetic (e.g., infrared light) signals. The captured reflected electromagnetic signals may enable the range-finding system (or processing system) to determine a range to various objects. The laser range finder may also be able to determine a velocity or speed of target objects and store it as environment data.

Additionally, in an example, a microphone may be configured to capture audio of the environment surrounding the vehicle. Sounds captured by the microphone may include emergency vehicle sirens and the sounds of other vehicles. For example, the microphone may capture the sound of the siren of an ambulance, fire engine, or police vehicle. A processing system may be able to identify that the captured audio signal is indicative of an emergency vehicle. In another example, the microphone may capture the sound of an exhaust of another vehicle, such as that from a motorcycle. A processing system may be able to identify that the captured audio signal is indicative of a motorcycle. The data captured by the microphone may form a portion of the environment data.

In yet another example, the radio unit may be configured to transmit an electromagnetic signal that may take the form of a Bluetooth signal, 802.11 signal, and/or other radio technology signal. The first electromagnetic radiation signal may be transmitted via one or more antennas located in a radio unit. Further, the first electromagnetic radiation signal may be transmitted with one of many different radio-signaling modes. However, in some embodiments it is desirable to transmit the first electromagnetic radiation signal with a signaling mode that requests a response from devices located near the autonomous vehicle. The processing system may be able to detect nearby devices based on the responses communicated back to the radio unit and use this communicated information as a portion of the environment data.

In some embodiments, the processing system may be able to combine information from the various sensors in order to make further determinations of the environment of the vehicle. For example, the processing system may combine data from both radar information and a captured image to determine if another vehicle or pedestrian is in front of the autonomous vehicle. In other embodiments, other combinations of sensor data may be used by the processing system to make determinations about the environment.

While operating in an autonomous mode, the vehicle may control its operation with little-to-no human input. For example, a human-operator may enter an address into the vehicle and the vehicle may then be able to drive, without further input from the human (e.g., the human does not have to steer or touch the brake/gas pedals), to the specified destination. Further, while the vehicle is operating autonomously, the sensor system may be receiving environment data. The processing system of the vehicle may alter the control of the vehicle based on environment data received from the various sensors. In some examples, the vehicle may alter a velocity of the vehicle in response to environment data from the various sensors. The vehicle may change velocity in order to avoid obstacles, obey traffic laws, etc. When a processing system in the vehicle identifies objects near the vehicle, the vehicle may be able to change velocity, or alter the movement in another way.

When the vehicle detects an object but is not highly confident in the detection of the object, the vehicle can request a human operator (or a more powerful computer) to perform one or more remote assistance tasks, such as (i) confirm whether the object is in fact present in the environment (e.g., if there is actually a stop sign or if there is actually no stop sign present), (ii) confirm whether the vehicle's identification of the object is correct, (iii) correct the identification if the identification was incorrect and/or (iv) provide a supplemental instruction (or modify a present instruction) for the autonomous vehicle. Remote assistance tasks may also include the human operator providing an instruction to control operation of the vehicle (e.g., instruct the vehicle to stop at a stop sign if the human operator determines that the object is a stop sign), although in some scenarios, the vehicle itself may control its own operation based on the human operator's feedback related to the identification of the object.

To facilitate this, the vehicle may analyze the environment data representing objects of the environment to determine at least one object having a detection confidence below a threshold. A processor in the vehicle may be configured to detect various objects of the environment based on environment data from various sensors. For example, in one embodiment, the processor may be configured to detect objects that may be important for the vehicle to recognize. Such objects may include pedestrians, street signs, other vehicles, indicator signals on other vehicles, and other various objects detected in the captured environment data.

The detection confidence may be indicative of a likelihood that the determined object is correctly identified in the environment, or is present in the environment. For example, the processor may perform object detection of objects within image data in the received environment data, and determine that at least one object has the detection confidence below the threshold based on being unable to identify the object with a detection confidence above the threshold. If a result of an object detection or object recognition of the object is inconclusive, then the detection confidence may be low or below the set threshold.

The vehicle may detect objects of the environment in various ways depending on the source of the environment data. In some embodiments, the environment data may come from a camera and be image or video data. In other embodiments, the environment data may come from a lidar unit. The vehicle may analyze the captured image or video data to identify objects in the image or video data. The methods and apparatuses may be configured to monitor image and/or video data for the presence of objects of the environment. In other embodiments, the environment data may be radar, audio, or other data. The vehicle may be configured to identify objects of the environment based on the radar, audio, or other data.

In some embodiments, the techniques the vehicle uses to detect objects may be based on a set of known data. For example, data related to environmental objects may be stored to a memory located in the vehicle. The vehicle may compare received data to the stored data to determine objects. In other embodiments, the vehicle may be configured to determine objects based on the context of the data. For example, street signs related to construction may generally have an orange color. Accordingly, the vehicle may be configured to detect objects that are orange, and located near the side of roadways as construction-related street signs. Additionally, when the processing system of the vehicle detects objects in the captured data, it also may calculate a confidence for each object.

Further, the vehicle may also have a confidence threshold. The confidence threshold may vary depending on the type of object being detected. For example, the confidence threshold may be lower for an object that may require a quick responsive action from the vehicle, such as brake lights on another vehicle. However, in other embodiments, the confidence threshold may be the same for all detected objects.

When the confidence associated with a detected object is greater than the confidence threshold, the vehicle may assume the object was correctly recognized and responsively adjust the control of the vehicle based on that assumption.

When the confidence associated with a detected object is less than the confidence threshold, the actions that the vehicle takes may vary. In some embodiments, the vehicle may react as if the detected object is present despite the low confidence level. In other embodiments, the vehicle may react as if the detected object is not present.

When the vehicle detects an object of the environment, it may also calculate a confidence associated with the specific detected object. The confidence may be calculated in various ways depending on the embodiment. In one example, when detecting objects of the environment, the vehicle may compare environment data to predetermined data relating to known objects. The closer the match between the environment data and the predetermined data, the higher the confidence. In other embodiments, the vehicle may use mathematical analysis of the environment data to determine the confidence associated with the objects.

In response to determining that an object has a detection confidence that is below the threshold, the vehicle may transmit, to the remote computing system, a request for remote assistance with the identification of the object. As discussed above, the remote computing system may take various forms. For example, the remote computing system may be a computing device within the vehicle that is separate from the vehicle, but with which a human operator can interact while a passenger or driver of the vehicle, such as a touchscreen interface for displaying remote assistance information. Additionally or alternatively, as another example, the remote computing system may be a remote computer terminal or other device that is located at a location that is not near the vehicle.

The request for remote assistance may include the environment data that includes the object, such as image data, audio data, etc. The vehicle may transmit the environment data to the remote computing system over a network (e.g., network 304), and in some embodiments, via a server (e.g., server computing system 306). The human operator of the remote computing system may in turn use the environment data as a basis for responding to the request.

In some embodiments, when the object is detected as having a confidence below the confidence threshold, the object may be given a preliminary identification, and the vehicle may be configured to adjust the operation of the vehicle in response to the preliminary identification. Such an adjustment of operation may take the form of stopping the vehicle, switching the vehicle to a human-controlled mode, changing a velocity of the vehicle (e.g., a speed and/or direction), among other possible adjustments.

In other embodiments, even if the vehicle detects an object having a confidence that meets or exceeds the threshold, the vehicle may operate in accordance with the detected object (e.g., come to a stop if the object is identified with high confidence as a stop sign), but may be configured to request remote assistance at the same time as (or at a later time from) when the vehicle operates in accordance with the detected object.

Figure 4:
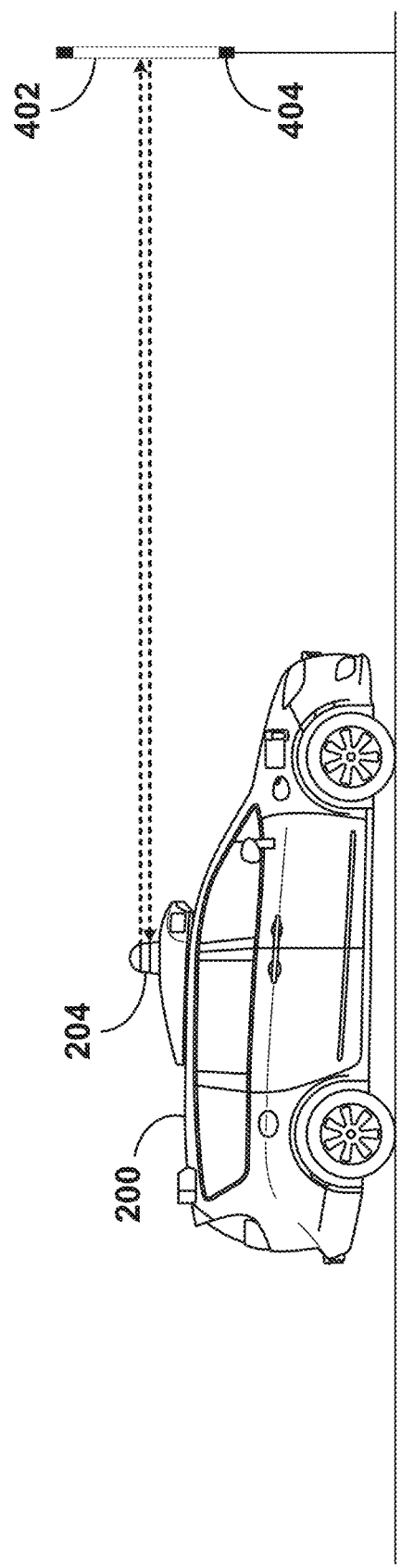
FIG. 4 is an illustration of a calibration setup, according to example embodiments.

FIG. 4 is an illustration of a calibration setup, according to example embodiments. As illustrated, the calibration setup may include a vehicle (e.g., the vehicle 200 shown and described with reference to FIGS. 2A-3) and an associated lidar device (e.g., the first lidar unit 204 shown and described with reference to FIGS. 2A-3). Further, the calibration setup may include a lidar calibration target 402 and a background 404. In the illustration of FIG. 4, part of the background 404 may be removed (e.g., a section of the background adjacent to the lidar calibration target 402 along the y-z plane) so the lidar calibration target 402 is visible. As such, FIG. 4 is provided for illustration only and may not necessarily represent an actual calibration setup. The lidar calibration target 402 and the background 404 may be separated from the lidar device 204 in an x-direction, as illustrated. Additionally or alternatively, the lidar device 204 may be separated from the lidar calibration target 402 and the background 404 in a y-direction and/or a z-direction.

The lidar device 204 may make one or more measurements (e.g., distance measurements and/or reflectivity measurements) of the lidar calibration target 402 and/or the background 404. In some embodiments, these measurements may be amalgamated into a point cloud (e.g., a three-dimensional point cloud). For example, a controller of the lidar device 204 and/or a separate processor (e.g., associated with the vehicle 200 of with a fleet management server) may combine one or more measurements into a point cloud representation. Additionally, measurements of the lidar calibration target 402 and/or the background 404 may be used to calibrate the lidar device 204 and/or to localize the lidar calibration target 402 and/or the background 404 to perform future calibrations.

Calibrating the lidar device 204 may improve the accuracy with which the lidar device 204 makes measurements in runtime (e.g., to perform object detection and avoidance). For example, in some embodiments, the lidar calibration target 402 may include a surface that has at least one characterized reflectivity. For instance, the lidar calibration target 402 may have one or more regions (e.g., between 5 and 10 regions) that have different predetermined characterized reflectivities. In some embodiments, one or more of the reflective regions of the surface of the lidar calibration target 402 may be panels attached to a frame that defines a perimeter of the lidar calibration target 402. In other embodiments, one or more of the regions with predetermined reflectivities may be overlays mounted on the background 404. In other implementations, any suitable object and/or structure may be used as a lidar calibration target, such as buildings, walls, shipping containers, sheds, etc. The reflectivities of these objects and/or structures may be known or determined by a computing device using a calibrated lidar device.

The background 404, for example, may be a flat backing panel (e.g., a slab of non-reflective material and/or an object covered in non-reflective material such as black gaffer tape). The background 404 may allow for edge-detection for edges of the lidar calibration target 402 and/or may prevent high-intensity returns from being generated and interfering with calibration and/or localization measurements. Preventing high-intensity returns may be particularly useful at the mounting locations (e.g., where one or more of the reflective regions of the lidar calibration target 402 are adhered to the background 404).

A map of the predetermined reflectivities of the various regions of the surface of the lidar calibration target 402 may be stored within a data storage (e.g., a non-transitory, computer-readable medium) such that they may be used when determining offsets based on the measured distance from the lidar device 204 to the lidar calibration target 402 and the actual distance from the lidar device 204 to the lidar calibration target 402. The predetermined reflectivities of the various regions of the surface of the lidar calibration target 402 may be used to simulate different objects in the environment that have different inherent reflectivities (e.g., a tree, a pedestrian, a vehicle, a road surface, a retroreflector, etc.).

It is understood that the figures are provided solely as examples and that various reflectivities for surfaces of the lidar calibration target 402 and the background 404 are possible and contemplated herein. For example, as described above, the surface of the lidar calibration target 402 may have relatively high reflectivity and the background may have relatively low reflectivity. Alternatively, in some embodiments, the surface of the lidar calibration target 402 may have relatively low reflectivity and the background may have relatively high reflectivity. Such embodiments may allow for calibration of lidar devices for detecting low reflectivity objects using the lidar calibration target 402, for example.

Calibrating the lidar device 204 using the lidar calibration target 402 may include making one or more calibration measurements of the lidar calibration target 402 using the lidar device 204. For example, a series of calibration measurements may be made, resulting in a series of offsets (e.g., differences between an actual distance between the lidar device 204 and the lidar calibration target 402 and an apparent distance between the lidar device 204 and the lidar calibration target 402). These offsets may be stored (e.g., within a memory) in a lookup table, calibration curve, and/or other type of data structure. The lookup table and/or calibration curve may relate the apparent distance to an object in a surrounding environment to the actual distance to an object in the surrounding environment. Determining such a calibration curve may include applying interpolation, extrapolation, and/or regression techniques. Further, the calibration curve may be non-linear. Additionally, the calibration curve and/or the lookup table may be used to adjust measurements in runtime of the lidar device 204 to determine proper distances to objects in the surrounding environment. In some embodiments, multiple calibration curves and/or multiple lookup tables may be generated and stored for use in runtime. For example, a separate calibration curve may be generated for each pair of detectors/light emitters within the lidar device 204, for each of a number of weather conditions, and/or for each of a number of times of day.

In some embodiments, localizing the lidar calibration target 402 may improve the accuracy with which and the speed at which future calibrations of the lidar device 204 (or other lidar devices within the fleet) may be performed. For example, in cases where the lidar calibration target 402 is not localized, the lidar device 204 may first perform coarse measurements to identify the location of the lidar calibration target 402 and may then follow up with refined measurements in order to calibrate the lidar device 204 once the location of the lidar calibration target 402 is identified. Hence, by localizing the calibration target using the setup of FIG. 4 and the techniques described herein, future localizations may be obviated or reduced, which may eliminate or reduce the number of coarse measurements made to identify the location of the lidar calibration target 402 (e.g., thereby reducing the time used to perform a calibration of the lidar device 204 using the lidar calibration target 402).

FIG. 5A is a front-view illustration (e.g., along x-axis) of the lidar calibration target 402 and the background 404, according to example embodiments. As illustrated in FIG. 5A, the background 404 may surround the periphery of the lidar calibration target 402 along the y-direction (both to the left and to the right of the lidar calibration target 402) and along the z-direction (both above and below the lidar calibration target 402). In other embodiments, the background 404 may instead surround the lidar calibration target along only one direction (e.g., only the y-direction or only the z-direction). Further, as illustrated in FIGS. 5A and 5B, the lidar calibration target 402 may be rectangular and may have a planar surface. The lidar calibration target 402 may also have other shapes in other embodiments (e.g., a circular shape, a triangular shape, a pentagonal shape, a hexagonal shape, a heptagonal shape, an octagonal shape, irregular shapes, etc.). Further, in some embodiments, the lidar calibration target 402 may have a non-planar surface. Similar to the lidar calibration target 402, the background 404 may have a rectangular shape and a planar surface. Also similar to the lidar calibration target 102, in other embodiments the background 404 may have other shapes and/or a non-planar surface.

The reflectivity of the surface of the lidar calibration target 402 may be different from the reflectivity of the surface of the background 404. For example, the surface of the lidar calibration target 402 may be highly reflective (e.g., greater than 50%, greater than 75%, greater than 90%, greater than 95%, greater than 99%, or greater than 99.9% reflectivity), while the background 404 may have low reflectivity (e.g., less than 50%, less than 25%, less than 10%, less than 5%, less than 1%, or less than 0.1% reflectivity). In this way, the surface of the lidar calibration target 402 may be readily distinguishable from the surface of the background 404. Further, in some embodiments, the surface of the lidar calibration target 402 and/or the surface of the background 404 may have approximately uniform lambertian reflectivity across the surface (i.e., the reflectivity may be approximately the same at all points on the surface and when viewed from any angle relative to the surface). However, in other embodiments, the surface of the lidar calibration target 402 and/or the surface of the background 404 may be non-uniform (e.g., different regions of the surface have different reflectivities). For example, the surface of the lidar calibration target 402 may have a gradient reflectivity (e.g., the reflectivity is higher near a center of the surface of the lidar calibration target 402 than near an edge of the surface of the lidar calibration target 402, or vice versa). In this way, the reflectivity of a given region of the lidar calibration target 402 may be usable to identify the relative location of that region within the lidar calibration target 402 (e.g., when considering the intensity of detected points within a point cloud). Similarly, the surface of the background 404 may also have a gradient reflectivity. Additionally or alternatively, one or more sections of the surface of the lidar calibration target 402 and/or one or more sections of the surface of the background 404 may have non-lambertian reflectivity. In this way, the intensity of detected signals may be usable to determine a viewing angle relative to the lidar calibration target 402 and/or the background 404.

FIG. 5B is a side-view illustration (e.g., along the y-axis) of the lidar calibration target 402 and the background 404, with a portion of the background 404 removed along the y-z plane (e.g., so the lidar calibration target 402 is visible), according to example embodiments. As illustrated in FIG. 5B, the surface of the lidar calibration target 402 and the surface of the background 404 may be located at the same x-position. As such, in a calibration setup (e.g., the calibration setup illustrated in FIG. 4), the lidar calibration target 402 and the background 404 may be the same distance from the lidar device 204 (e.g., as the lidar device 204 is performing a calibration and/or performing a localization of the lidar calibration target 402 and/or the background 404) along the x-direction. The lidar device 204 may use differences in reflectivities between the lidar calibration target 402 and the background 404 to distinguish between the lidar calibration target 402 and the background 404 (e.g., within a point cloud to determine the location of the lidar calibration target 402). For example, if the lidar calibration target 402 has a high reflectivity, points in a point cloud that correspond to the lidar calibration target 402 may exist at a given depth based on detected reflections from the lidar calibration target 402. Likewise, if the background 404 has a low reflectivity, points that would otherwise be in the point cloud and would correspond to the background 404 may not be present in the point cloud because no reflections were detected from the background 404 (e.g., because the background 404 absorbed the light signals transmitted by the lidar device 204 and did not reflect the signals back to the lidar device 204) or may exist within the point cloud but at a lower intensity than the points corresponding to the lidar calibration target 402.

FIG. 6A is a front-view illustration (e.g., along an x-axis) of the lidar calibration target 402 and a background 604 (e.g., a different background than illustrated in FIGS. 5A and 5B), according to example embodiments. Unlike the embodiment of FIGS. 5A and 5B, in FIG. 6A, surfaces of the lidar calibration target 402 and the background 604 may have the same reflectivity (e.g., approximately uniform lambertian reflectivities). As such, in the embodiment of FIG. 6A, differences in reflectivity might not be usable (e.g., by a processor analyzing a point cloud) to distinguish between the lidar calibration target 402 and the background 604.

FIG. 6B is a side-view illustration (e.g., along a y-axis) of the lidar calibration target 402 and the background 604, according to example embodiments. As illustrated in FIG. 6B, the lidar calibration target 402 and the background 604 (e.g., centers of the lidar calibration target 402 and the background 604 or surfaces of the lidar calibration target 402 and the background 604) may be located at different x-positions. As such, the lidar calibration target 402 and the background 604 may be located at different distances (e.g., along the x-direction) from the lidar device 204 when the lidar device 204 is performing a calibration and/or localization of the lidar calibration target 402 (e.g., as in the calibration/localization setup of FIG. 4). Additionally or alternatively, in some embodiments, the lidar calibration target 402 and the background 604 (e.g., centers of the lidar calibration target 402 and the background 604 or surfaces of the lidar calibration target 402 and the background 604) may be positioned at different y-positions and/or z-positions than one another. In this way, the lidar calibration target 402 and the background 604 may also be located at different distances in the y-direction and/or z-direction from the lidar device 204 when the lidar device 204 is performing a calibration and/or localization of the lidar calibration target 402. In embodiments where the lidar calibration target 402 and the background 604 are positioned at different positions (e.g., different ranges) relative to the lidar device 204, the differences in depth may be used (e.g., by a controller of the lidar device 204 and/or a processor analyzing a point cloud) to distinguish between the lidar calibration target 402 and the background 604. For example, points in a point cloud that correspond to the surface of the lidar calibration target 402 may be at one depth, while points in the point cloud that correspond to the surface of the background 604 may be at a different depth.

It is understood that FIGS. 5A-6B are provided as examples and that other techniques for providing a background that is distinguishable from the lidar calibration target 402 are also possible and contemplated herein. For example, in some embodiments, the technique of FIGS. 5A and 5B may be combined with the technique of FIGS. 6A and 6B. In other words, the reflectivity of the surface of the background may be different from the reflectivity of the surface of the lidar calibration target 402 (e.g., as in FIGS. 5A and 5B) and the background may be positioned at a different distance from the lidar device 204 than the lidar calibration target (e.g., as in FIGS. 6A and 6B). In such embodiments, both the reflectivity and the distance may be used to distinguish between the lidar calibration target 402 and the background. In other embodiments, the lidar calibration target 402 may reflect one type of polarization (e.g., a horizontal polarization) while the background reflects a different type of polarization (e.g., a vertical polarization). If the lidar device 204 includes detectors that can disambiguate between polarization types, this too could be a difference used to distinguish between the lidar calibration target 402 and the background. Other differences between the lidar calibration target 402 and the background are also possible and are contemplated herein.

Figure 7A:
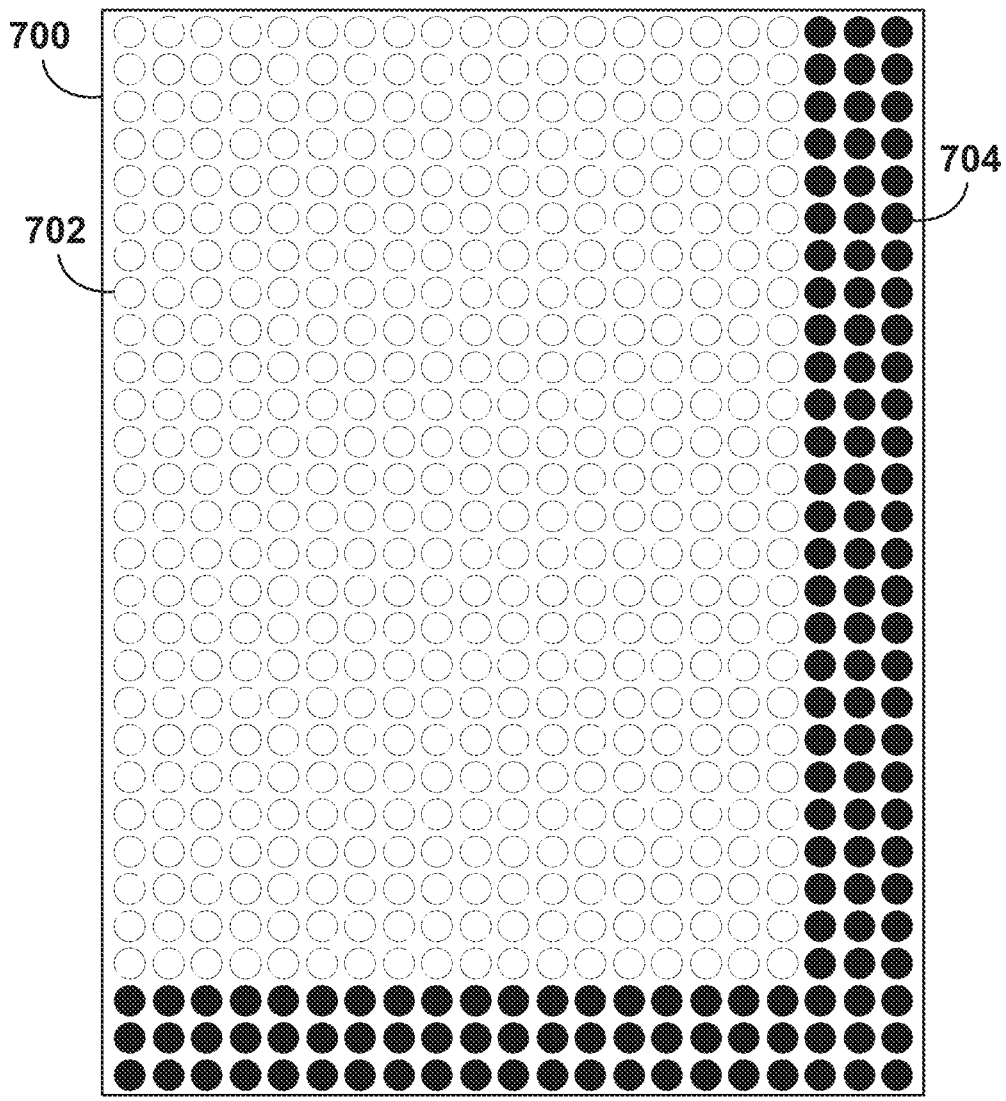
FIG. 7A is an illustration of a point cloud generated using a lidar device, according to example embodiments.

FIG. 7A is an illustration of a point cloud 700 (or a portion of a point cloud) generated using a lidar device (e.g., the lidar device 204 illustrated in FIG. 4), according to example embodiments. The point cloud 700 may represent a series of points that are generated by emitting a series of light signals from a light emitter of the lidar device 204 and detecting a series of reflections of the emitted light signals. Based on the time delay and/or intensity of the reflected signals relative to the emitted signals, information about the distance to respective locations in a surrounding environment and/or reflectivity of objects in the surrounding environment may be recorded in the form of the point cloud 700. In some embodiments, the point cloud 700 may be generated by a controller of the lidar device 204, a controller of a vehicle associated with a lidar device, or a fleet management server (e.g., associated with a fleet of lidar devices and/or a fleet of vehicles). Alternatively, measurements made by the lidar device 204 may be transmitted to one or more other computing devices (e.g., in addition to or instead of a controller of the lidar device 204, a controller of a vehicle associated with a lidar device, or a fleet management server) to generate the point cloud 700. In some embodiments, the point cloud 700 may be stored in a memory (e.g., a memory of a controller of the lidar device 204 or a memory of a fleet management server).

The point cloud 700 in FIG. 7A may be generated using the lidar device 204 based on a presumed location of the lidar calibration target 402. For example, the lidar device 204 may be oriented such that the generated point cloud 700 would include points corresponding to the lidar calibration target 402 if the lidar calibration target 402 were at the presumed location (e.g., or within a threshold distance of the presumed location of the lidar calibration target 402). In some embodiments, for instance, the boundaries of the point cloud 700 may correspond to points representing the expected boundaries of the lidar calibration target 402 if the lidar calibration target 402 were at the presumed location. In other embodiments, only a portion of the lidar calibration target 402 may be represented in the point cloud 700 if the lidar calibration target 402 were located at the presumed location. In still other embodiments, the entirety of the lidar calibration target 402 plus the background 404 (e.g., and possibly additional objects besides the lidar calibration target 402 and the background 404) may be represented in the point cloud 700 if the point cloud 700 were located at the presumed location. Further, based on the point cloud 700, the lidar calibration target 402 may be localized as described herein (e.g., to account for variations between the presumed location of the lidar calibration target 402 and an actual location of the lidar calibration target 402). The lidar calibration target 402 may be localized in order to perform future calibrations of the lidar device 204 or calibrations of other lidar devices within the same fleet of lidar devices as the lidar device 204 (e.g., the localized position of the lidar calibration target 402 may be communicated by the lidar device 204 or a fleet management server to other lidar devices in a fleet and/or or other lidar devices attached to the same vehicle as the lidar device 204 and then used by the other lidar devices to perform calibrations). In addition to or instead of localizing the lidar calibration target 402 based on the point cloud 700 (e.g., in order to perform later calibrations), the lidar device 204 may be calibrated directly based on the point cloud 700.

In some embodiments, the point cloud 700 may be stored within a memory of the lidar device 204, a memory of a vehicle associated with the lidar device 204, and/or a memory of a fleet management server associated with a fleet of lidar devices (e.g., including the lidar device 204). In this way, the point cloud 700 may be analyzed by a computing device associated with the lidar device 204 and/or by the fleet management server at a later time. For example, the presumed location of the lidar calibration target 402 may be revised (e.g., the lidar calibration target 402 may be localized) after the lidar device 204 is calibrated based on the point cloud 700 or while a vehicle associated with lidar device 204 is not in motion. Further, the point cloud 700 may be used in conjunction with other point clouds to perform a refined localization of the lidar calibration target 402 (e.g., similar to the technique shown and described with reference to FIG. 9).

The point cloud 700 may include points corresponding to signals emitted and, in some cases, detected by the lidar device 204. As illustrated in FIG. 7A, the point cloud 700 may include target points 702 and background points 704. The target points 702 may represent measurements where a signal emitted by the lidar device 204 was reflected from the lidar calibration target 402 and detected by the lidar device 204 with a detected intensity above a threshold intensity and/or with a time delay corresponding to a distance within a threshold target range (e.g., within a threshold variation relative to an expected position of the lidar calibration target 402). Further, the background points 704 may represent points where a signal was emitted by the lidar device 204, but a corresponding reflected signal was not detected by the lidar device 204. In other embodiments (e.g., in embodiments that include the background 404 illustrated in FIGS. 4-5B), the background points 704 may represent points where a signal was emitted by the lidar device 204 and a corresponding reflected signal was detected by the lidar device 204, but the detected, reflected signal had a detected intensity below a threshold intensity (e.g., a detected intensity that corresponds to the reflectivity of the background 404). In still other embodiments (e.g., in embodiments that include the background 604 illustrated in FIGS. 6A and 6B), the background points 704 may represent points where a light signal was emitted by the lidar device 204 and a corresponding reflected signal was detected by the lidar device 204, but the detected, reflected signal was detected with a time delay corresponding to a distance within a threshold background range (e.g., within a threshold variation relative to an expected position of the background 604).

It is understood that FIG. 7A is provided as an example only, and that other point clouds are possible and contemplated herein. For example, in other embodiments, the light cloud may have a different aspect ratio than illustrated in FIG. 7A. Additionally or alternatively, the light cloud may have a different spacing among data points (e.g., among target points 702 and/or background points 704) based on the spacing of the light emitters and/or light detectors within the lidar device 204 and/or based on a scanning frequency and/or scanning range of the lidar device 204 (e.g., in embodiments where the lidar device 204 rotates and/or translates to measure a field of view). Further, in some embodiments, types of points other than target points 702 and background points 704 may be identified. For example, if a point is detected that corresponds to a time delay that represents a range that is outside possible ranges for the lidar calibration target 402 and the background 404, 604, the point may be identified as a miss or an aberration (e.g., and may be ignored for localization techniques described herein).

Figure 7B:
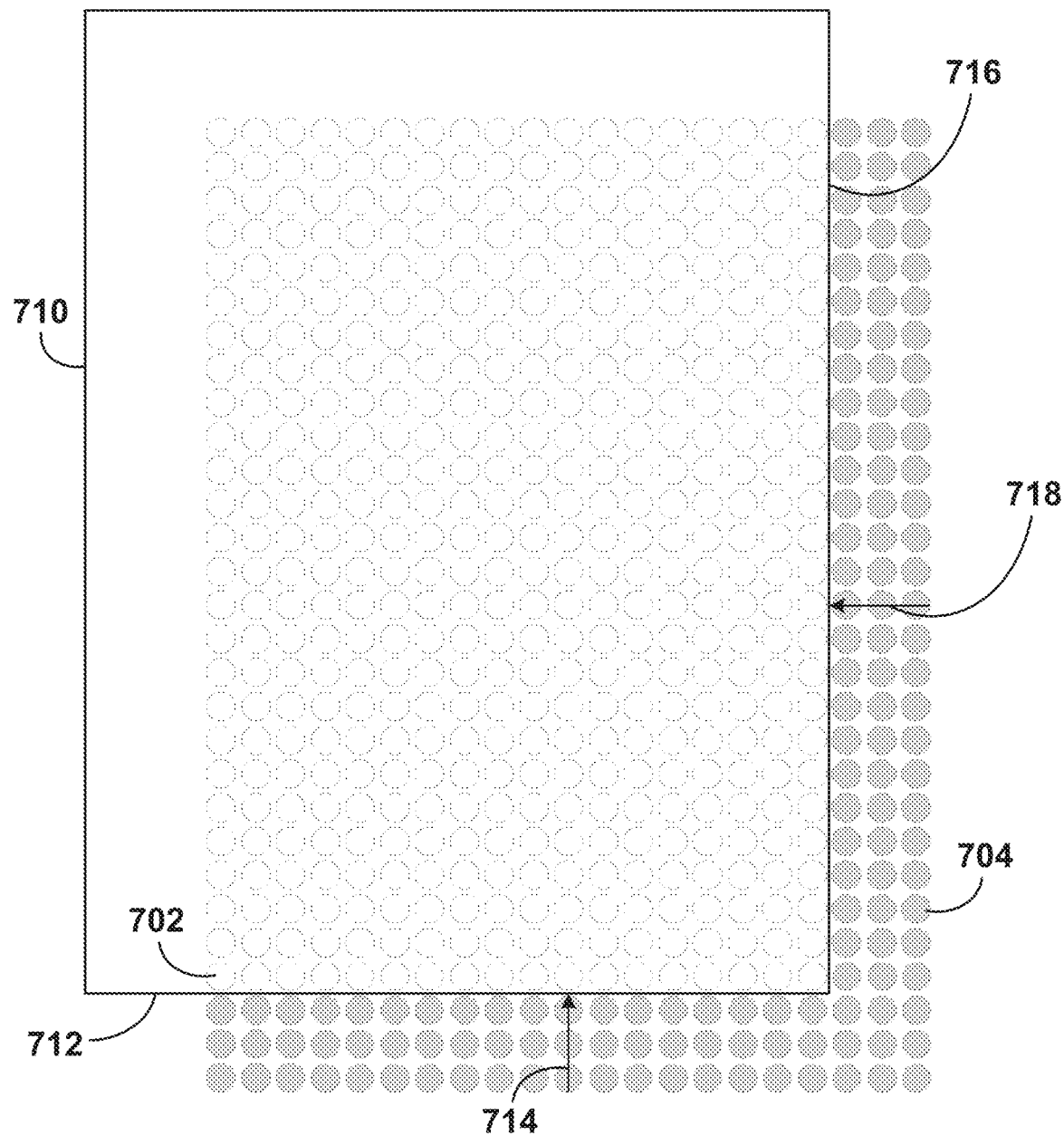
FIG. 7B is an illustration of a method of localizing a lidar calibration target based on a point cloud generated using a lidar device, according to example embodiments.

FIG. 7B is an illustration of a method of localizing a lidar calibration target (e.g., the lidar calibration target 402 illustrated in FIGS. 4-6B) based on a point cloud (e.g., the point cloud 700 illustrated in FIG. 7A) generated using a lidar device (e.g., the lidar device 204 illustrated in FIG. 4), according to example embodiments. For example, in embodiments where the boundaries of the point cloud 700 would correspond to the boundaries of the lidar calibration target 402 if the lidar calibration target 402 were at the presumed location, any deviations from this within the point cloud 700 (e.g., portions of the point cloud 700 that correspond to the background 404 or objects other than the lidar calibration target 402) may be used to localize the lidar calibration target 402 (e.g., to identify the actual position of the lidar calibration target 402 relative to the presumed location in order to update the presumed location of the lidar calibration target 402).

Localizing the lidar calibration target 402 may include identifying a first edge 712 of the lidar calibration target 402 within the point cloud. Identifying the first edge 712 of the lidar calibration target 402 may include identifying a transition between target points 702 and background points 704. As described above, identifying this transition may include distinguishing a surface of the lidar calibration target 402 from the background 404 based on a threshold difference in reflectivity between the surface of the lidar calibration target 402 and the background 404 (e.g., based on the setup illustrated in FIGS. 5A and 5B). Alternatively, identifying the transition may include distinguishing a surface of the lidar calibration target 402 from the background 404 based on a threshold difference in distance relative to the lidar device 204 between the surface of the lidar calibration target 402 and the background 404 (e.g., based on the setup illustrated in FIGS. 6A and 6B). The first edge 712 may represent an actual edge of the lidar calibration target 402.

The first edge 712 of the lidar calibration target may then be compared to a predicted edge (i.e., hypothetical edge) of the lidar calibration target 402. For example, in embodiments where the point cloud 700 would exactly align with the lidar calibration target 402 if the lidar calibration target 402 were located at the presumed location, the edge of the point cloud 700 would correspond to the first edge 712 of the lidar calibration target 402 if the lidar calibration target 402 were at the presumed location. If, however, the first edge 712 of the lidar calibration target 402 does not align with the edge of the point cloud 700, then, a first offset 714 may be determined. The first offset 714 may represent the distance between the predicted location of the first edge 712 based on the presumed location of the lidar calibration target 402 and the actual location of the first edge 712 based on the point cloud 700.

In some embodiments, the presumed location of the lidar calibration target 402 may include a geographic location of the lidar calibration target 402. For example, the presumed location may include global positioning system (GPS) coordinates of the lidar calibration target 402 (e.g., latitude and longitude coordinates). Alternatively, the presumed location may include a three-dimensional position of the lidar calibration target 402 in a coordinate system of the lidar device 204 (e.g., a spherical coordinate system with lidar device 204 at the origin). In addition, the presumed location may be based on a localization that was previously performed by the lidar device 204 or a different lidar device (e.g., a different lidar device within the same fleet of lidar devices as the lidar device 204 or a different lidar device on the same vehicle as the lidar device 204).

In some embodiments, the presumed location of the lidar calibration target 402 may correspond to a location of a center of a surface of the lidar calibration target 402. In other embodiments, the presumed location may correspond to a location of a base of the lidar calibration target 402 or a top-most point of the lidar calibration target 402. In still other embodiments, the presumed location may correspond to a three-dimensional model of the lidar calibration target 402 positioned in three-dimensional space at the appropriate location.

Further, the presumed location may be stored within a memory associated with the lidar device 204 (e.g., a memory of the lidar device 204, a memory of a vehicle associated with the lidar device 204, and/or a memory of a fleet management server that manages a fleet of lidar devices including the lidar device 204). In some embodiments, the presumed location may be transmitted to the lidar device 204 and/or a computing device associated with the lidar device 204. For example, a fleet management server that manages a fleet of lidar devices may transmit the presumed location of the lidar calibration target 402 before a localization and/or calibration is performed. The presumed location may have previously been transmitted to the fleet management server by another lidar device in the fleet of lidar devices and/or the presumed location may have been stored in a memory associated with the fleet management server. In other examples, another lidar device and/or a computing device associated with another lidar device may transmit the presumed location to the lidar device 204 and/or a computing device associated with the lidar device 204. The presumed location may have been stored in a memory associated with the other lidar device after a previous localization and/or calibration performed by the other lidar device, for example.

Still further, in some embodiments, the presumed location may incorporate a size and/or shape of the lidar calibration target 402. For example, if a surface of the lidar calibration target 402 is a circle, the location of a centerpoint (e.g., defined in terms of latitude and longitude) of the surface of the lidar calibration target 402 may be combined with the radius of the lidar calibration target 402 to identify a predicted edge of the lidar calibration target 402. Other shapes of the lidar calibration target 402 are also possible (e.g., triangles, rectangles, pentagons, hexagons, heptagons, octagons, nonagons, decagons, etc.).

After comparing the predicted edge of the lidar calibration target 402 to the first edge 712, the presumed location of the lidar calibration target 402 may be revised based on the first offset 714. As described above, the revised presumed location 710 of the lidar calibration target 402 may be used by the lidar device 204 for future calibrations and/or localizations of the lidar calibration target 402. Additionally or alternatively, the revised presumed location 710 of the lidar calibration target 402 may be used by other lidar devices for calibrations and/or localizations of the lidar calibration target 402. For example, the lidar device 204 or a computing device associated with the lidar device 204 (or a computing device associated with a vehicle, which itself is associated with the lidar device 204) may transmit the revised presumed location 710 of the lidar calibration target to another lidar device (e.g., another lidar device on the same vehicle as the lidar device 204 or another lidar device in the same fleet as the lidar device 204), a computing device associated with another lidar device (or a computing device associated with another vehicle, which itself is associated with another lidar device), or to a fleet management server (e.g., for dissemination to other lidar devices in the fleet). In some embodiments, the revised presumed location 710 of the lidar calibration target 402 may be used by the lidar device 204 for a calibration of the lidar device 204 using the same point cloud 700 as was used to perform localization.

In some embodiments, more than one edge of the lidar calibration target 402 may be used to generate the revised presumed location 710 of the lidar calibration target 402. For example, as illustrated in FIG. 7B, a second edge 716 of the lidar calibration target 402 may be identified within the point cloud 700 (e.g., based on a transition between target points 702 and background points 704). Similar to the first edge 712, a predicted (i.e., hypothetical) second edge of the point cloud 700 may correspond to the second edge 716 of the lidar calibration target 402 within the point cloud 700 if the lidar calibration target 402 were at the original presumed location. Also similar to the first edge 712, a second offset 718 may represent the distance between the predicted location of the second edge 716 based on the presumed location of the lidar calibration target 402 and the actual location of the second edge 716 based on the point cloud 700. In addition to the first offset 714, the presumed location of the lidar calibration target 402 may be revised based on the second offset 718. It is understood that the two edges 712, 716 illustrated in FIG. 7B are provided solely as an example embodiment. In other embodiments, other numbers of edges and offsets may be determined in order to revise the presumed location of the lidar calibration target 402. For example, in various embodiments, one edge/offset, three edges/offsets, four edges/offsets, five edges/offsets, six edges/offsets, seven edges/offsets, eight edges/offsets, nine edges/offsets, ten edges/offsets, etc. may be used.

In some embodiments, more than two types of points (e.g., more than target points 702 and background points 704) may be identified within the point cloud 700 prior to performing edge-detection for the first edge 712 and/or the second edge 716. For example, in some embodiments, a first category of points may be identified. The first category of points may include points that may be disregarded for edge-detection. The first category of points may include, for example, points that correspond to reflections that, had the reflection been reflected from the lidar calibration target 402, and the lidar calibration target 402 was at the presumed location, the reflection would be at an angle of incidence relative to the lidar calibration target 402 that is above a threshold angle of incidence. The threshold angle of incidence may indicate an angle at which the reflected light ray would be detectable by the lidar device 204. As such, if the reflection should be at an angle of incidence above the threshold angle of incidence if the lidar calibration target 402 were at the presumed location, those points may correspond to noise from sources other than light emitters of the lidar device 204 (e.g., and those points may therefore be ignored as aberrations for edge-detections) and/or may result in relatively low-intensity reflected signals, thereby making those reflected signals less reliable when used for ultimate calibration of the lidar device 204 (e.g., as those signals may be prone to false positive detections from the lidar device 204, particularly if the lidar calibration target 402 is non-lambertian). Similarly, the first category of points may include points that correspond to reflections representing a distance that is more than a threshold margin closer to the lidar device 204 than the lidar calibration target 402 would be if the lidar calibration target 402 were at the presumed location. Again, if the lidar calibration target 402 were at the presumed location, such points may correspond to objects occluding the lidar calibration target 402 (e.g., pedestrians, vehicles, etc.). Therefore, those points may also be ignored as aberrations for edge-detections.

There may be a second category of points within the point cloud 700, however, that are used for edge-detections. The second category may include points corresponding to reflections that represent distances that are within a threshold margin of the distance from the lidar device 204 to the lidar calibration target 402 if the lidar calibration target were actually positioned at the presumed location. In addition, the second category may include reflections that correspond to reflectivities that are within a threshold margin of the reflectivities of the lidar calibration target 402 (e.g., of a surface of the lidar calibration target 402). Because the second category of points corresponds to points that would correspond to the lidar calibration target 402 if the lidar calibration target 402 were at the presumed location, the second category of points may be used for edge-detection.

Further, there may also be a third category of points within the point cloud 700 that are also used for edge-detections. The third category may include points representing reflections that correspond to a distance that is within a threshold margin of the distance from the lidar device 204 to the background 404 if the lidar calibration target 402 and background 404 were positioned at the presumed location. Additionally, the third category may include points corresponding to reflections that correspond to reflectivities that are within a threshold reflectivity of the background 404. Because the third category of points correspond to points that would represent the background 404 if the lidar calibration target 402 were at the presumed location, the third category of points may be used for edge-detection (e.g., to determine an edge of the lidar calibration target 402 relative to the background 404 based on the point cloud 700). In some embodiments, for example, identifying the first edge 712, the second edge 716, and/or subsequent edges of the lidar calibration target 402 within the point cloud 700 may include performing edge-detection between points within the second category of points and the third category of points described above.

Figure 7C:
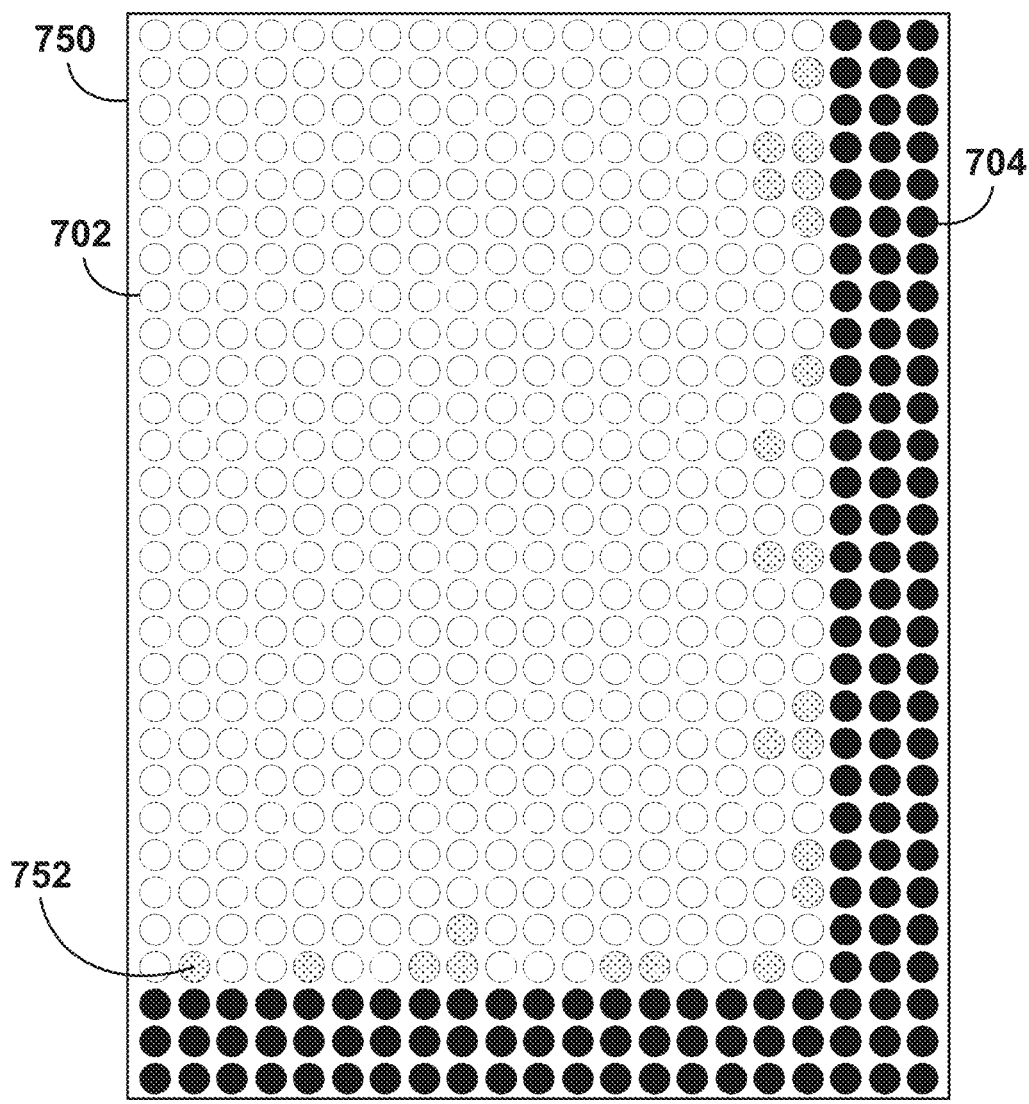
FIG. 7C is an illustration of a point cloud generated using a lidar device, according to example embodiments.

FIG. 7C is an illustration of a point cloud 750 generated using a lidar device (e.g., the lidar device 204 illustrated in FIG. 4), according to example embodiments. The point cloud 750 of FIG. 7C may be generated in a similar fashion to the point cloud 700 illustrated in FIG. 7A. For example, the point cloud 750 may represent a series of points that are generated by emitting light signals from one or more light emitters of the lidar device 204 and detecting reflections of those emitted light signals. Based on the time delay and/or intensity of the reflected signals relative to the emitted signals, information about the distances to respective locations in a surrounding environment and/or reflectivities of objects in the surrounding environment may be recorded in the form of the point cloud 750. In some embodiments, the point cloud 750 may be generated (e.g., measurements from the lidar device 204 may be amalgamated into a the point cloud 750) using a controller of the lidar device 204, a controller of a vehicle associated with a lidar device, or a fleet management server (e.g., associated with a fleet of lidar devices and/or a fleet of vehicles). Alternatively, measurements made by the lidar device 204 may be transmitted to one or more other computing devices (e.g., in addition to or instead of a controller of the lidar device 204, a controller of a vehicle associated with a lidar device, or a fleet management server) to generate the point cloud 750. In some embodiments, the point cloud 750 may be stored in a memory (e.g., a memory of a controller of the lidar device 204 or a memory of a fleet management server).

Also like the point cloud 700 of FIG. 7A, the point cloud 750 of FIG. 7C may include target points 702 and background points 704. However, for one reason or another, the delineation of the edge of the lidar calibration target 402 relative to the background 404 may not be as clear based on the point cloud 750 as in the point cloud 700 of FIG. 7A. This may be because the measurements by the lidar device 204 are not as precise in the embodiment of FIG. 7C, because there is external noise present during the measurement of FIG. 7C, and/or because a large beam size associated with a light emitter of the lidar device 204 causes one or more of the signals to overlap (e.g., due to crosstalk between channels in the lidar device 204). Other reasons for the jagged and/or inconsistent boundary between the target points 702 and the background points 704 are also possible. As illustrated in FIG. 7C, the point cloud 750 may include one or more ambiguous points 752 (e.g., points that are not clearly identifiable as either target points 702 or background points 704). The ambiguous points 752 may be identified as ambiguous based on the detected intensity of those points lying between an ambiguity range (e.g., a predetermined range of intensity values which correspond to reflectivities that do not obviously correspond to either the reflectivity of the surface of the lidar calibration target 402 or the reflectivity of the background 404). Because of the ambiguous points 752, there may not be a clear boundary between the lidar calibration target 402 and the background 404 within the point cloud 750. In embodiments where such ambiguity regarding edges occurs within the point cloud exists, or even simply to be conservative when localizing the lidar calibration target 402 (e.g., by only using those regions of the point cloud that are most likely to correspond to actual portions of a surface of the lidar calibration target 402 to localize the lidar calibration target 402), a tolerance may be built-in when performing the edge-detection and, thereby, when revising a presumed location of the lidar calibration target 402. A technique of localization employing such a tolerance is illustrated and described with reference to FIG. 7D.

Figure 7D:
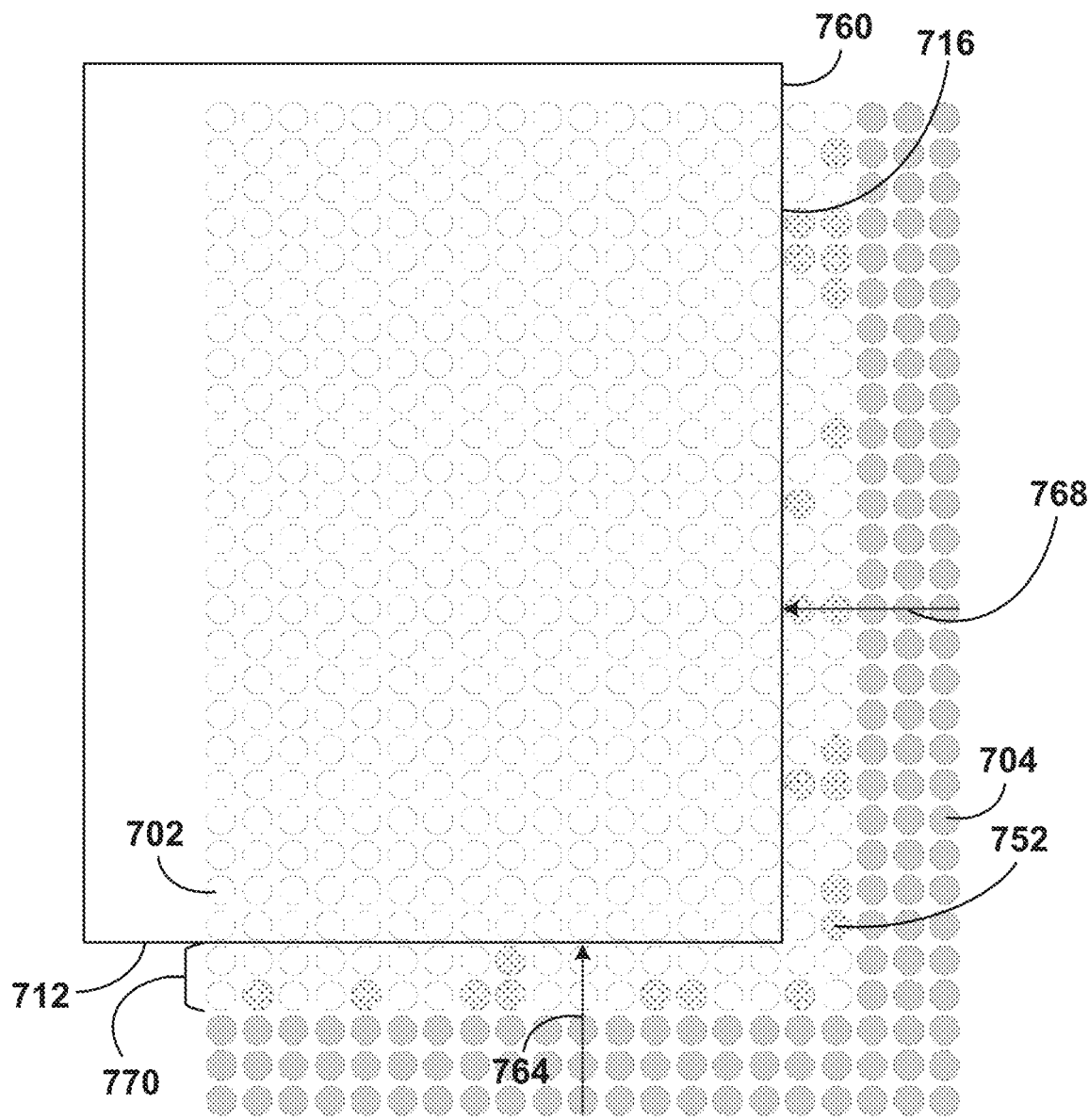
FIG. 7D is an illustration of a method of localizing a lidar calibration target based on a point cloud generated using a lidar device, according to example embodiments.

FIG. 7D is an illustration of a method of localizing a lidar calibration target (e.g., the lidar calibration target 402 illustrated in FIGS. 4-6B) based on a point cloud (e.g., the point cloud 750 illustrated in FIG. 7B) generated using a lidar device (e.g., the lidar device 204 illustrated in FIG. 4), according to example embodiments. Similar to the technique illustrated in FIG. 7B, the boundaries of the point cloud 750 may align with the boundaries of the lidar calibration target 402 if the lidar calibration target 402 were at the presumed location. Hence, any deviations from this alignment within the point cloud 750 (e.g., portions of the point cloud 750 that correspond to the background 404 or objects other than the lidar calibration target 402) may be used to localize the lidar calibration target 402 (e.g., to identify the actual position of the lidar calibration target 402 relative to the presumed location in order to update the presumed location of the lidar calibration target 402). However, the technique of FIG. 7D includes a tolerance 770 used when determining the first offset 764, unlike the first offset 714 of FIG. 7B. The technique of FIG. 7D may include a similar tolerance when determining the second offset 768, unlike the second offset 718 of FIG. 7B. The tolerances may prevent a false positive regarding regions of the surface of the lidar calibration target 402 from being identified. As illustrated in FIG. 7D, using the first offset 764 and the second offset 768, a revised presumed location 760 of the lidar calibration target 402 may be determined based on the point cloud 750 of FIG. 7C.

The size of the tolerance 770 may be determined based on a number of factors. For example, the size of the tolerance 770 may be based on the point cloud 750 itself (e.g., the more jagged the apparent edges of the lidar calibration target 402 are, the greater the size of the tolerance 770 that may be used, and vice versa). In some embodiments, for example, the tolerance 770 may be sized such that when a surface of the lidar calibration target 402 is identified, that surface only includes target points 702 and excludes all background points 704 and ambiguous points 752 (e.g., as illustrated in FIG. 7D). In other embodiments, the tolerance 770 may be sized such that when a surface of the lidar calibration target 402 is identified, that surface includes target points 702 and ambiguous points 752, and excludes only background points 704. Additionally or alternatively, the size of the tolerance 770 may be based on a previous localization technique and/or previous calibration technique performed using the lidar device 204 (e.g., the more accurately the location of the lidar calibration target 402 was previously determined or the more accurately the lidar device 204 was previously calibrated, the smaller the size of the tolerance 770, and vice versa). Still further, the size of the tolerance 770 may be based on the shape of the lidar calibration target 402, one or more communications from one or more other lidar devices (e.g., other lidar devices on the same vehicle as the lidar device 204 or on different vehicles within the same fleet as the lidar device 204), and/or one or more communications from a fleet management server.

While the tolerance 770 in a first direction (e.g., a vertical direction) associated with the first offset 764 and a tolerance in a second direction (e.g., a horizontal direction) associated with the second offset 768 in FIG. 7D are the same size, it is understood that, in alternate embodiments, one or more tolerances may have different sizes in different directions. For example, in some embodiments, the tolerance in a horizontal direction may be smaller or larger than the tolerance in a vertical direction. Even further, in some embodiments, some directions may not use tolerances while other directions do (e.g., a tolerance is used in a horizontal direction, but not in a vertical direction). Still further, in embodiments having more than two edges that are to be detected to revise the presumed location of the lidar calibration target 402, each of the edges may have a separate tolerance applied.

Figure 8A:
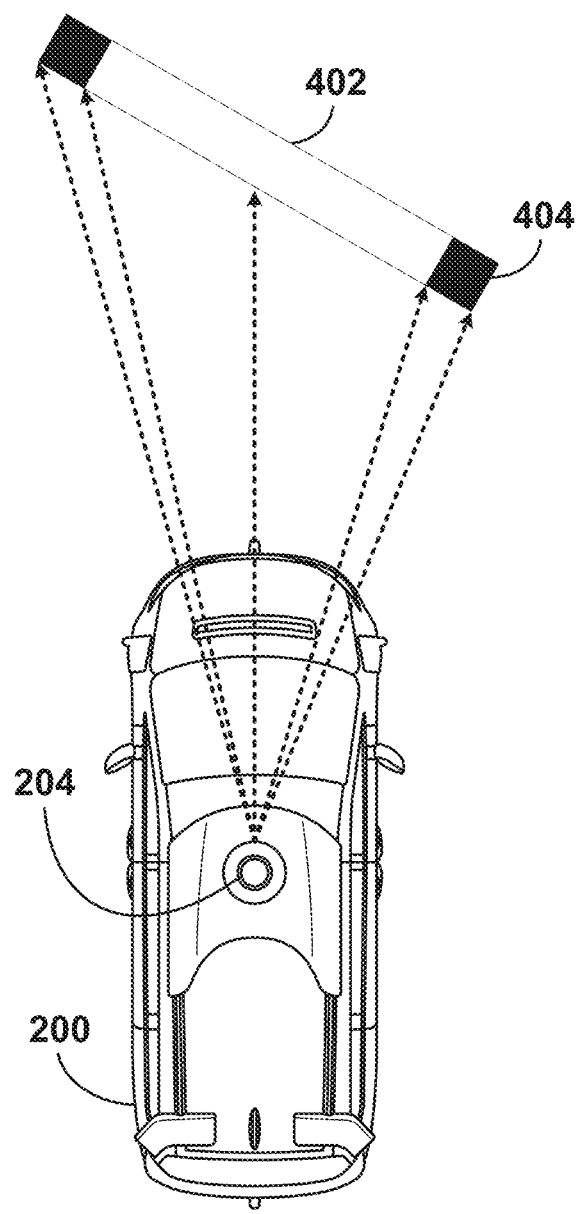
FIG. 8A is an illustration of a calibration setup, according to example embodiments.

FIG. 8A is an illustration (e.g., a top-view illustration from above the lidar device 204 and the vehicle 200) of a calibration setup, according to example embodiments. The calibration setup of FIG. 8A may be similar to the calibration setup illustrated in FIG. 4. However, unlike the calibration setup illustrated in FIG. 4, the lidar calibration target 402 and the background 404 may be positioned at an angle relative to the lidar device 204 and the vehicle 200. As such, the distances from the lidar device 204 to various portions of the lidar calibration device 402 and the background 404 may be different. This is illustrated in FIG. 8A by the dashed arrows of different lengths.

Figure 8B:
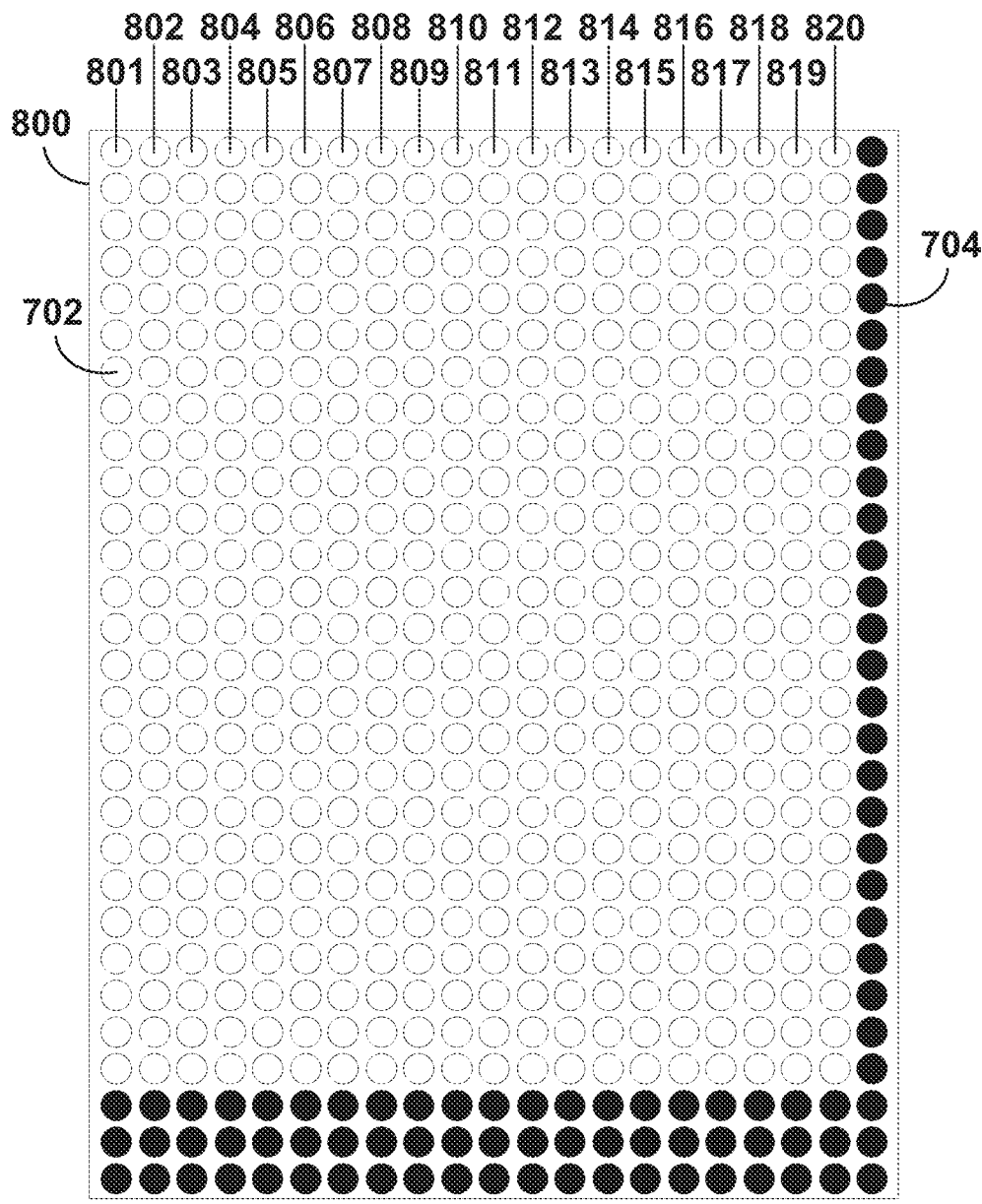
FIG. 8B is an illustration of a point cloud generated using a lidar device, according to example embodiments.

FIG. 8B is an illustration of a point cloud 800 generated using a lidar device (e.g., the lidar device 204 illustrated in FIG. 8A), according to example embodiments. Further, the point cloud 800 may have been generated based on measurements made using a calibration setup similar to the calibration setup of FIG. 8A. As such, the point cloud 800 of FIG. 8B may be different from the point cloud 700 of FIG. 7A (e.g., even if the lidar calibration target 402 and the background 404 used to generate both point clouds 700, 800 are the same). For example, while the point cloud 800 may include both target points 702 and background points 704, the depths corresponding to those points may be different. In the point cloud 800 of FIG. 8B, for instance, there may be many columns corresponding to the target points 702 (e.g., a first column 801, a second column 802, a third column 803, a fourth column 804, a fifth column 805, a sixth column 806, a seventh column 807, an eighth column 808, a ninth column 809, a tenth column 810, an eleventh column 811, a twelfth column 812, a thirteenth column 813, a fourteenth column 814, a fifteenth column 815, a sixteenth column 816, a seventeenth column 817, an eighteenth column 818, a nineteenth column 819, and a twentieth column 820). The target points 702 in each respective column may correspond to a different range than the target points 702 in the other columns. For example, based on the arrangement of the calibration setup illustrated in FIG. 8A, the apparent distance to the target points 702 in the first column 801 may be greater than the apparent distance to the target points 702 in the second column 802, the apparent distance to the target points 702 in the second column 802 may be greater than the apparent distance to the target points 702 in the third column 803, the apparent distance to the target points 702 in the third column 803 may be greater than the apparent distance to the target points 702 in the fourth column 804, etc.

Additionally, the relative feature sizes of the lidar calibration target 402 and the background 404 may also be different. As illustrated, for instance, there may be only one column of returns corresponding to background points 704, rather than the three columns illustrated in FIG. 7A. This may be due to the variation in perspective of the lidar device 204 of the calibration setup of FIG. 8A when compared to the perspective of the lidar device 204 of the calibration setup of FIG. 4. It is understood that FIG. 8B is provided solely as an example and that other variations based on perspectives are also possible and contemplated herein when the lidar calibration target 402 and the background 404 are at an angle relative to the lidar device 204.

As illustrated in the calibration setup of FIG. 8A, the lidar calibration target 402 and the background 404 may be angled relative to the lidar device 204 in a yaw direction. However, it is understood that in other embodiments the lidar calibration target 402 and the background 404 could be angled relative to the lidar device 204 in other directions. For example, the lidar calibration target 402 and the background 404 could be angled relative to the lidar device 204 in a pitch direction and/or a roll direction in addition to or instead of being angled relative to the lidar device 204 in a yaw direction. The localization techniques described herein could equally be used to localize and determine the orientation of the lidar calibration target 402 regardless of the angular orientation of the lidar calibration target 402 relative to the lidar device 204.

As described above, a presumed location of the lidar calibration target 402 may be determined prior to performing a localization of the lidar calibration target 402. For example, the presumed location of the lidar calibration target 402 may be used to identify which portions of a surrounding environment to measure using the lidar device 204 to generate a point cloud (e.g., the point cloud 700 of FIG. 7A or the point cloud 800 of FIG. 8B). Additionally, the presumed location may be used to determine one or more hypothetical edges of the lidar calibration target 402 within a point cloud such that the actual edges within the point cloud can be compared to the hypothetical edges. This comparison, as described above, can be used to revise the presumed location of the lidar calibration target 402 for future calibrations and/or localizations.

In some embodiments, determining the presumed location of the lidar calibration target 402 prior to performing the localization of the lidar calibration target 402 may include determining (e.g., in a coordinate system of the lidar device 204) a presumed three-dimensional position of a center of the lidar calibration target 402. Further, the presumed location of the lidar calibration target may include a presumed angular orientation of a surface (e.g., a planar surface) of the lidar calibration target 402 relative to one or more scanning axes of the lidar device 204 (e.g., a yaw axis, a pitch axis, and/or a roll axis). The presumed angular orientation of the surface of the lidar calibration target 402 may be used to determine how the lidar calibration target 402 would appear in the point cloud if the lidar calibration target 402 were actually located at the presumed location (e.g., in embodiments where the lidar calibration target 402 is oriented at an angle relative to the lidar device 204). For example, if the presumed location of a center of a surface of the lidar calibration target 402 relative to the lidar device 204 is determined, a shape and size of the lidar calibration target 402 are determined, and an angular orientation of the surface of the lidar calibration target 402 relative to the lidar device 204 is determined, the hypothetical boundaries of the surface of the lidar calibration target 402 relative to the lidar device 204 may be determined (e.g., which may be used to determine how the lidar calibration target 402 would appear in a point cloud generated using the lidar device 204 if the lidar calibration target 402 were located at the presumed location and oriented at the presumed angular orientation).

Based on the determined presumed location (e.g., the determined angular orientation and position) of the lidar calibration target 402 and the point cloud 800, the presumed location of the lidar calibration target 402 may be revised. In some embodiments, revising the presumed location of the lidar calibration target 402 may include determining a revised three-dimensional position of the center of a surface of a lidar calibration target 402 based on a comparison of a hypothetical location of a center of a surface of the lidar calibration target 402 within the point cloud 800 (e.g., if the lidar calibration target 402 were located at the presumed location) to the identified location of the lidar calibration target 402 within the point cloud 800. Additionally or alternatively, revising the presumed location of the lidar calibration target 402 may include determining a revised angular orientation of the planar surface of the lidar calibration target 402 based on a comparison of the point cloud 800 to a hypothetical point cloud that would have been generated if the lidar calibration target 402 were located at the presumed location and had the presumed angular orientation. The revised angular orientation of the planar surface of the lidar calibration target 402 may be determined relative to one or more axes (e.g., a yaw axis, a pitch axis, and/or a roll axis of the lidar device 204). Further, the revised angular orientation of the planar surface of the lidar calibration target 402 may be determined using points within the point cloud 800 that are deemed to have been reflected from the lidar calibration target 402 (e.g., using the edge-detection technique described with reference to FIG. 7A). In addition, the revised angular orientation of the planar surface of the lidar calibration target 402 may be determined using a regression technique. For example, a singular value decomposition may be performed based on the various depths of the target points 702 within the point cloud 800.

Figure 9:
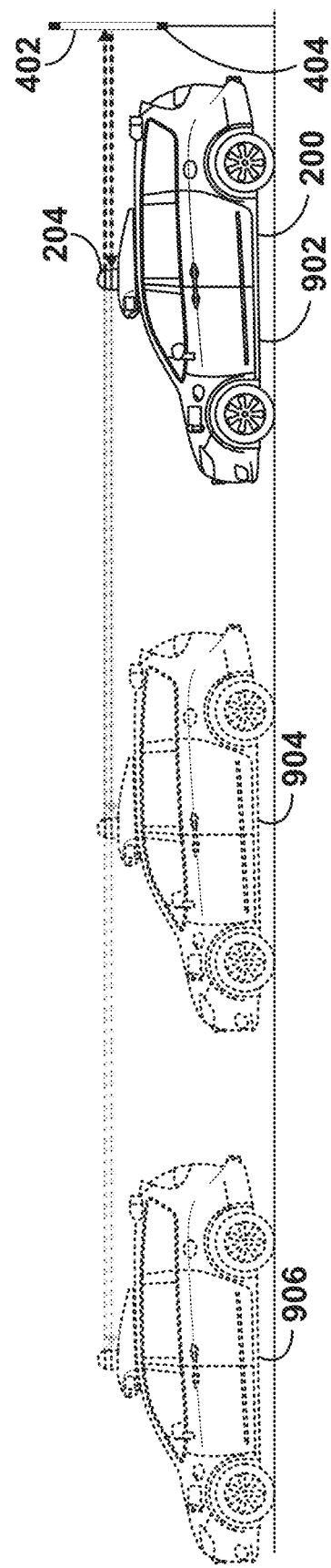
FIG. 9 is an illustration of a calibration setup, according to example embodiments.

FIG. 9 is an illustration of a calibration setup, according to example embodiments. As illustrated, the vehicle 200 and the lidar device 204 may move to multiple positions (e.g., a first position 902, a second position 904, and a third position 906) relative to the lidar calibration target 402 and the background 404. At each of the positions 902, 904, 906, the lidar device 204 may generate a point cloud. Each of these point clouds may be used (e.g. sequentially) to localize the lidar calibration target 402. For example, the point cloud generated by the lidar device 204 for one of the positions may be used to perform a coarse localization and the point cloud generated by the lidar device 204 at another position may be used to further refine the coarse localization (e.g., to perform a fine localization). For example, in some embodiments, a point cloud generated from the first position 902 may have a higher percentage of measurements that correspond to the lidar calibration target 402. This may be due to the fact that a higher percentage of the lidar device's field of view is occupied by the lidar calibration target 402 from the perspective of the first position 902 than from the perspective of the second position 904 or third position 906. Further, the point cloud generated from the first position 902 may have a higher resolution with respect to the point clouds generated from the second position 904 and the third position 906.

In some embodiments, the lidar device 204 may generate a point cloud of a region that includes the lidar calibration target 402 from one perspective relative to the lidar calibration target 402 (e.g., the first position 902), generate an additional point cloud of an additional region that includes the lidar calibration target 402 from another perspective relative to the lidar calibration target 402 (e.g., the second position 904), and generate a third point cloud of a third region that includes the lidar calibration target 402 from yet another perspective relative to the lidar calibration target 402 (e.g., the third position 906). Similar to the technique illustrated in FIG. 7B, an edge-detection may be performed using each of the generated point clouds to determine the locations of one or more edges of the lidar calibration target 402 within each point cloud. Further, the determined locations of the edges may be compared to hypothetical locations of the edges of the lidar calibration target 402 within the point clouds if the lidar calibration target 402 were located at the presumed location. After each comparison, the presume location of the calibration target may be further revised (e.g., further refined).

In some embodiments, prior to identifying an edge within the point clouds generated using additional perspectives of the lidar device 204 (e.g., prior to performing edge-detection within point clouds generated at the second position 904 or the third position 906), it may be determined whether the lidar calibration target 402 is even present within the point cloud generated at the first position 902 (e.g., whether there are any points within the point cloud that correspond to an approximate range and approximate reflectivity of a surface of the lidar calibration target 402).

In some embodiments, a point cloud may be generated by the lidar device 204 from one position (e.g., the first position 902), the point cloud may be analyzed to identify the location of the lidar calibration target 402 within the point cloud, the identified location may be compared to a hypothetical location of the lidar calibration target 402 within the point cloud if the lidar calibration target 402 were positioned at the presumed location, and the presumed location may be revised based on the comparison. Thereafter, the lidar device 204 may be moved to a different position (e.g., the second position 904) and the process of generating the point cloud and revising the presumed location based on the point cloud may be repeated. This may be repeated for any number of positions of the lidar device 204 (e.g., more than the three positions illustrated in FIG. 9).

In alternate embodiments, point clouds may be generated using the lidar device 204 located at each of the positions (e.g., the first position 902, the second position 904, and the third position 906) prior to analyzing any of the point clouds in order to revise the presumed location of the lidar calibration target 402. For example, the lidar device 204 may generate a first point cloud at the first position 902, the first point cloud may then be transmitted to a fleet management server and/or stored in a memory associated with the lidar device 204, the lidar device 204 may be moved to the second position 904, the lidar device 204 may then generate a second point cloud at the second position 904, the second point cloud may then be transmitted to the fleet management server and/or stored in the memory associated with the lidar device 204, the lidar device 204 may be moved to the third position 906, the lidar device 204 may then generate a third point cloud at the third position 906, the third point cloud may then be transmitted to the fleet management server and/or stored in the memory associated with the lidar device 204, and, finally, the three generated point clouds may be analyzed jointly or sequentially (e.g., by a controller of the lidar device 204, a controller of the vehicle 200, and/or the fleet management server) in order to revise the presumed location of the lidar calibration target 402.

Figure 10A:
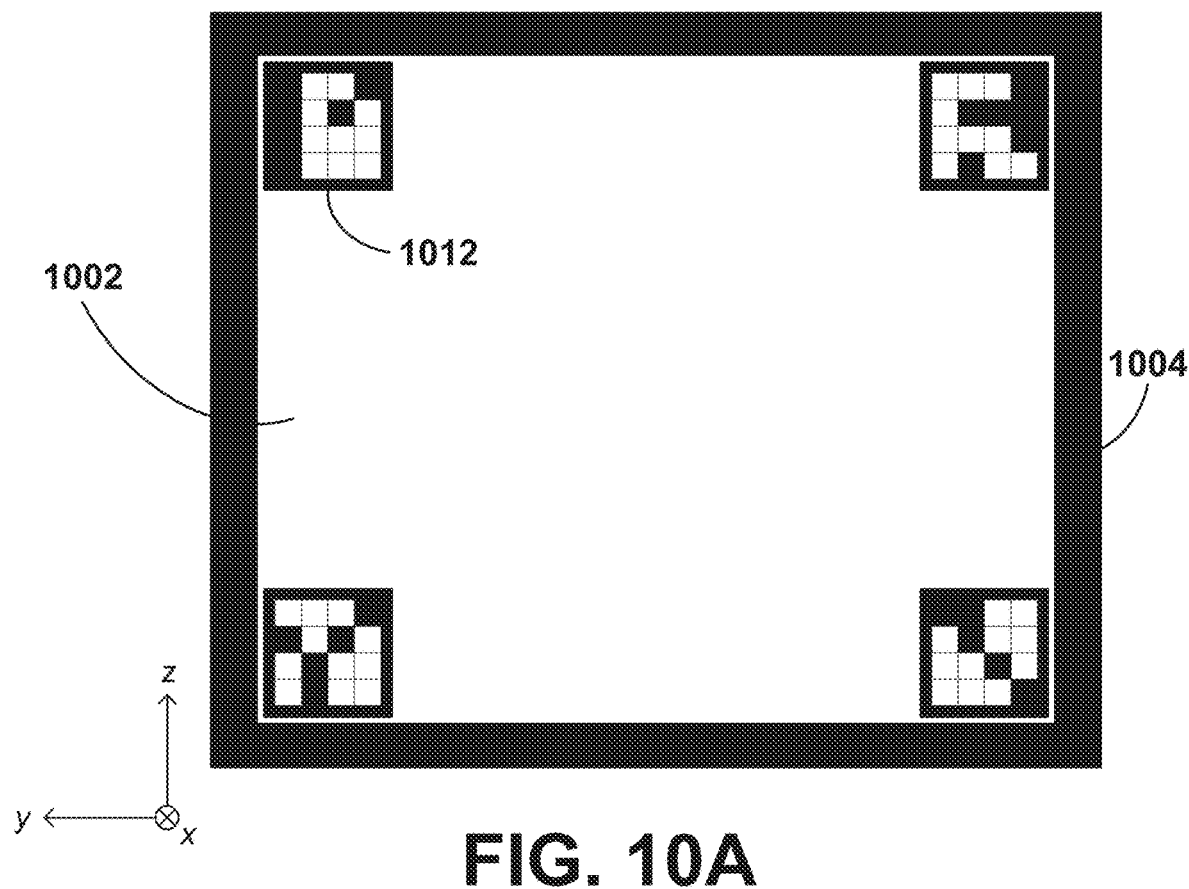
FIG. 10A is a front-view illustration of a lidar calibration target and a background, according to example embodiments.
Figure 10B:
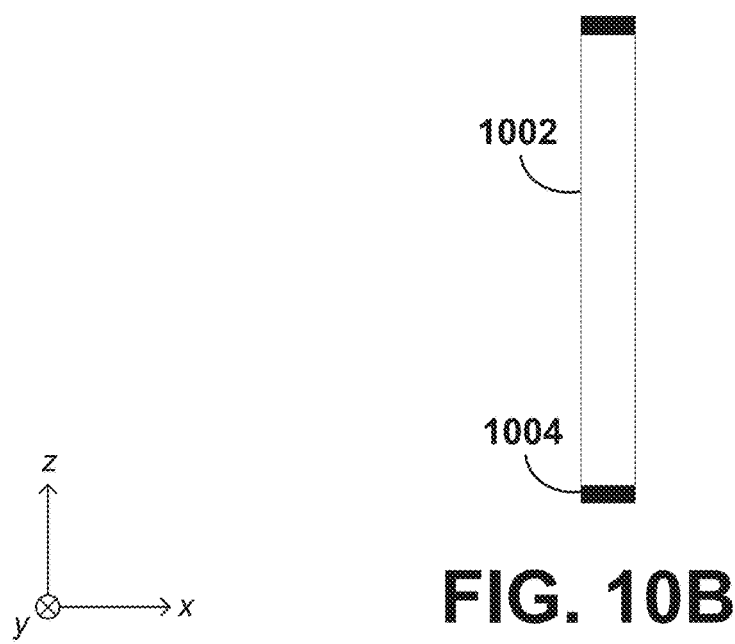
FIG. 10B is a side-view illustration of a lidar calibration target and a background, according to example embodiments.

FIG. 10A is a front-view illustration of a lidar calibration target 1002 and a background 1004, according to example embodiments. Like the lidar calibration target 402 illustrated in FIGS. 4-5B, the lidar calibration target 1002 may be usable to calibrate a lidar device (e.g., the lidar device 204 illustrated in FIG. 4). Similar to FIG. 5B, FIG. 10B is a side-view illustration of the lidar calibration target 1002 and the background 1004. Similar to the lidar calibration target 402 and the background 404 described above, a contrast in reflectivity between the lidar calibration target 1002 and the background 1004 may be used to identify an edge of the lidar calibration target 1002 and thereby to revise a presumed location of the lidar calibration target 1002.

Unlike the lidar calibration target 402 of FIGS. 4-5B, though, the lidar calibration target 1002 in FIG. 10A includes multiple fiducials 1012. The fiducials 1012 man include two-dimensional barcodes (e.g., Quick Response (QR) codes), as illustrated. In other embodiments, other identifying markings may be present on the fiducials 1012 (e.g., one-dimensional bar codes). Further, while the lidar calibration target 1002 in FIG. 10A includes four fiducials 1012 placed at corners of the surface of the lidar calibration target 1002, it is understood that this is provided as an example and that other numbers and/or arrangements of fiducials on the surface of the lidar calibration target 1002 are possible and contemplated herein.

In some embodiments, the fiducials 1012 may be used to calibrate an auxiliary sensor (e.g., a camera) associated with the lidar device 204 and/or the vehicle 200. Further, the fiducials 1012 may be used by an auxiliary sensor (e.g., a camera) associated with the lidar device 204 and/or the vehicle 200 to localize the lidar calibration target 1002 (e.g., in addition to or instead of using the lidar device 204 to localize the lidar calibration target 1002). For example, a camera associated with the lidar device 204 may capture an image of the lidar calibration target 1002. The image of the lidar calibration target 1002 may be captured by the camera at approximately the same time as a point cloud (e.g., the point cloud 700) is being generated by the associated lidar device 204, in some embodiments. Thereafter, in addition to or instead of comparing edges within a generated point cloud to hypothetical edges based on the presumed location, positions of the one or more fiducials 1012 in the captured image may be used to revise the presumed location of the lidar calibration target 1002. For example, the location of one or more fiducials 1012 within the captured image may be compared to hypothetical locations of the one or more fiducials 1012 within the captured image if the lidar calibration target 1002 were positioned at the presumed location when the image was captured by the camera (e.g., based on a position and/or orientation of the camera relative to the lidar device 204, the three-dimensional location of the lidar device 204, and/or a three-dimensional position of the camera).

III. Example Processes

Figure 11:
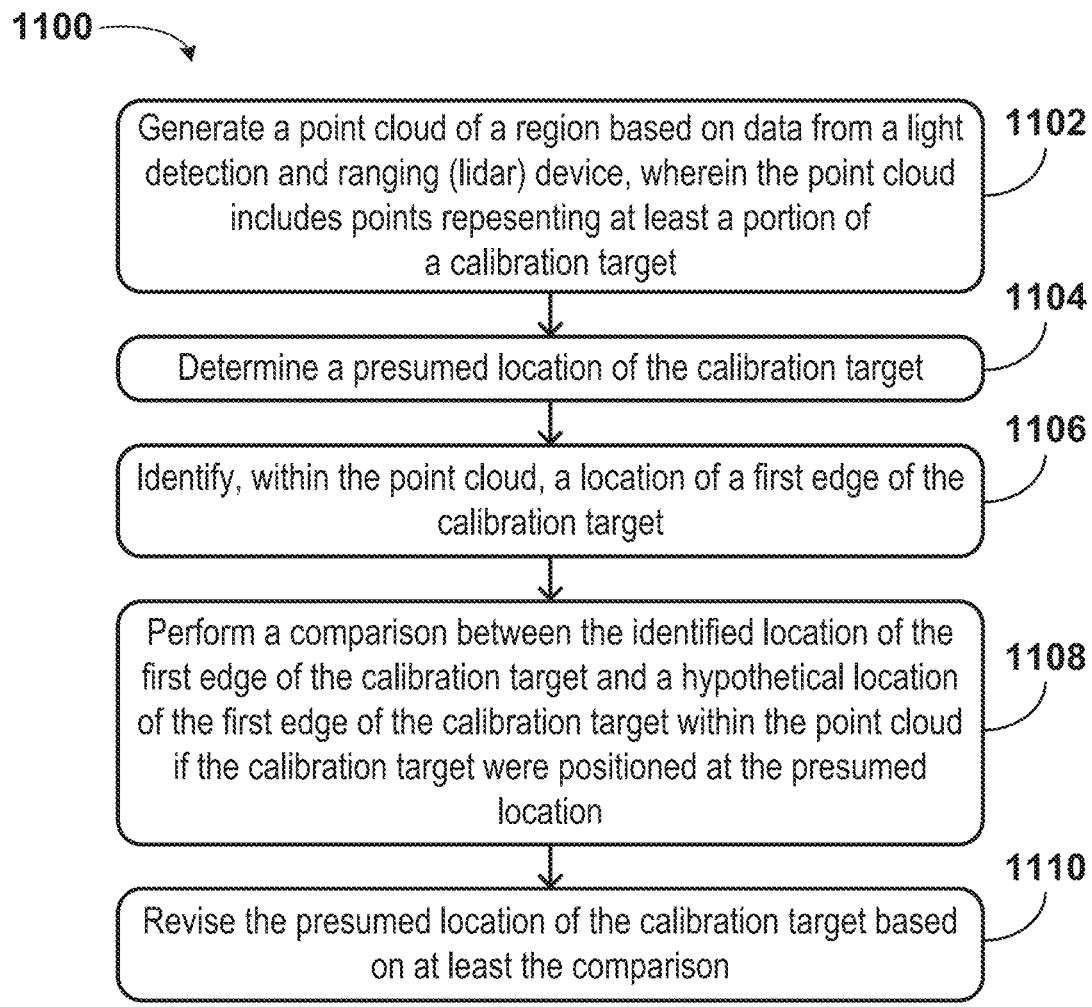
FIG. 11 is a flowchart illustration of a method, according to example embodiments.

FIG. 11 is a flowchart diagram of a method 1100, according to example embodiments.

At block 1102, the method 1100 may include generating a point cloud of a region based on data from a light detection and ranging (lidar) device. The point cloud may include points representing at least a portion of a calibration target. The calibration target may be usable to calibrate the lidar device.

At block 1104, the method 1100 may include determining a presumed location of the calibration target.

At block 1106, the method 1100 may include identifying, within the point cloud, a location of a first edge of the calibration target.

At block 1108, the method 1100 may include performing a comparison between the identified location of the first edge of the calibration target and a hypothetical location of the first edge of the calibration target within the point cloud if the calibration target were positioned at the presumed location.

At block 1110, the method 1100 may include revising the presumed location of the calibration target based on at least the comparison.

In some embodiments of the method 1100, block 1104 may include determining, in a coordinate system of the lidar device, a presumed three-dimensional position of a center of the calibration target. Further, block 1104 may include determining a presumed angular orientation of a planar surface of the calibration target relative to one or more scanning axes.

In some embodiments of the method 1100, block 1110 may include determining, in the coordinate system of the lidar device, a revised three-dimensional position of the center of the calibration target based on the comparison and a shape and size of the calibration target. Further, block 1110 may include determining a revised angular orientation of the planar surface of the calibration target relative to the one or more scanning axes using points within the point cloud that are deemed to have been reflected from the calibration target.

In some embodiments of the method 1100, the revised angular orientation of the planar surface of the calibration target relative to the one or more scanning axes using points within the point cloud that are deemed to have been reflected from the calibration target may be determined via regression using singular value decomposition.

In some embodiments of the method 1100, the calibration target may be rectangular. Further, the calibration target may have a planar surface. In addition, the planar surface may have approximately uniform lambertian reflectivity across the planar surface.

In some embodiments, the method 1100 may also include identifying, within the point cloud, a location of a second edge of the calibration target. Further, the method 1100 may include performing a further comparison between the identified location of the second edge of the calibration target and a hypothetical location of the second edge of the calibration target if the calibration target were positioned at the presumed location. Still further, the method 1100 may include revising the presumed location of the calibration target based on at least the further comparison.

In some embodiments, the method 1100 may include moving the lidar device relative to the calibration target. The method 1100 may also include generating, using the lidar device, an additional point cloud of an additional region that includes at least a portion of the calibration target. Further, the method 1100 may include identifying, within the additional point cloud, an additional location of the first edge of the calibration target. Additionally, the method 1100 may include performing an additional comparison between the identified additional location of the first edge of the calibration target and a hypothetical location of the first edge of the calibration target within the additional point cloud if the calibration target were positioned at the revised presumed location. Still further, the method 1100 may include further revising the presumed location of the calibration target based on the additional comparison.

In some embodiments of the method 1100, block 1106 may include distinguishing a surface of the calibration target from a background. The surface of the calibration target may be distinguishable from the background based on a threshold difference in reflectivity between the surface of the calibration target and the background.

In some embodiments of the method 1100, block 1106 may include distinguishing a surface of the calibration target from a background. The surface of the calibration target may be distinguishable from the background based on a threshold difference in distance relative to lidar device between the surface of the calibration target and the background.

In some embodiments of the method 1100, the calibration target may include one or more fiducials located thereon. Further, the method 1100 may include capturing, using a camera associated with the lidar device, an image of the calibration target. In addition, block 1110 may include revising the presumed location of the calibration target based on positions of the one or more fiducials in the captured image. In addition, block 1110 may include revising a presumed location of the calibration target based on a position and orientation of the camera relative to the lidar device.

In some embodiments of the method 1100, the presumed location may include a geographic location of the calibration target. Further, the geographic location may be stored within a memory associated with the lidar device.

In some embodiments of the method 1100, the presumed location may include a three-dimensional position of the calibration target in a coordinate system of the lidar device. Further, the three-dimensional position of the calibration target is stored within a memory associated with the lidar device.

In some embodiments of the method 1100, the presumed location may be based on a localization previously performed by the lidar device or a different lidar device.

In some embodiments of the method 1100, the presumed location may be transmitted to a computing device associated with the lidar device from a fleet management server or transmitted to the computing device associated with the lidar device from a computing device associated with a different lidar device.

In some embodiments, the method 1100 may also include storing, within a memory of the lidar device or within a memory of a fleet management server, the point cloud prior to identifying the location of the first edge of the calibration target in block 1106.

In some embodiments, the method 1100 may also include transmitting the revised presumed location of the calibration target to a fleet management server.

In some embodiments of the method 1100, block 1106 may include assigning each point within the point cloud to one category with a group of categories. The group of categories may include a first category of points to be disregarded for edge-detection. The points within the first category of points may correspond to (i) a reflection that, had the reflection been reflected from the calibration target based on the presumed location of the calibration target, the reflection would be at an angle of incidence relative to the calibration target that is above a threshold angle of incidence or (ii) a reflection corresponding to a distance that is more than a threshold margin closer to the lidar device than the calibration target would be if the calibration target were positioned at the presumed location. The group of categories may also include a second category of points to be used for edge-detection. The points within the second category of points may correspond to a reflection corresponding to (i) a distance that is within a threshold margin of the distance to the calibration target if the calibration target were positioned at the presumed location and (ii) a reflectivity that is within a threshold margin of a reflectivity of the calibration target. Further, the group of categories may include a third category of points to be used for edge-detection. The points within the third category of points may correspond to (i) a reflection corresponding to a distance that is within a threshold margin of the distance to a background of the calibration target if the calibration target were positioned at the presumed location (ii) a reflection corresponding to a reflectivity that is within a threshold reflectivity to a background of the calibration target.

In some embodiments of the method 1100, block 106 may include performing edge-detection between points within the second category of points and the third category of points.

In some embodiments, the method 1100 may include moving the lidar device relative to the calibration target. The method 1100 may also include capturing an additional point cloud of an additional region that includes at least a portion of the calibration target. Further, the method 1100 may include determining whether the calibration target is identifiable within the additional point cloud.

Figure 12:
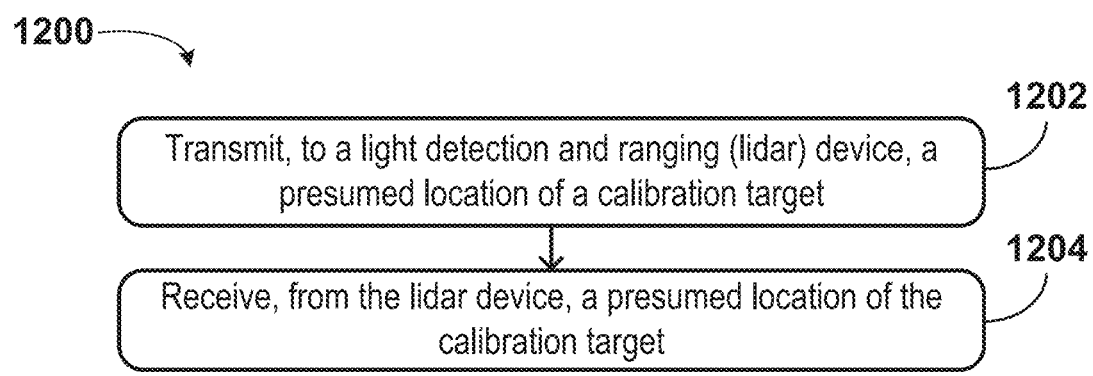
FIG. 12 is a flowchart illustration of a method, according to example embodiments.

FIG. 12 is a flowchart diagram of a method 1200, according to example embodiments.

At block 1202, the method 1200 may include transmitting, to a light detection and ranging (lidar) device, a presumed location of a calibration target. The calibration target may be usable to calibrate the lidar device.

At block 1204, the method 1200 may include receiving, from the lidar device, a presumed location of the calibration target. The revised presumed location of the calibration target may be determined by generating, using the lidar device, a point cloud of a region that includes at least a portion of the calibration target. The revised presumed location of the calibration target may also be determined by identifying, within the point cloud, a location of a first edge of the calibration target. Further, the revised presumed location of the calibration target may be determined by performing a comparison between the identified location of the first edge of the calibration target with a hypothetical location of the first edge of the calibration target within the point cloud if the calibration target were positioned at the presumed location. In addition, the revised presumed location of the calibration target may be determined by generating the revised presumed location of the calibration target based on at least the comparison.

Figure 13:
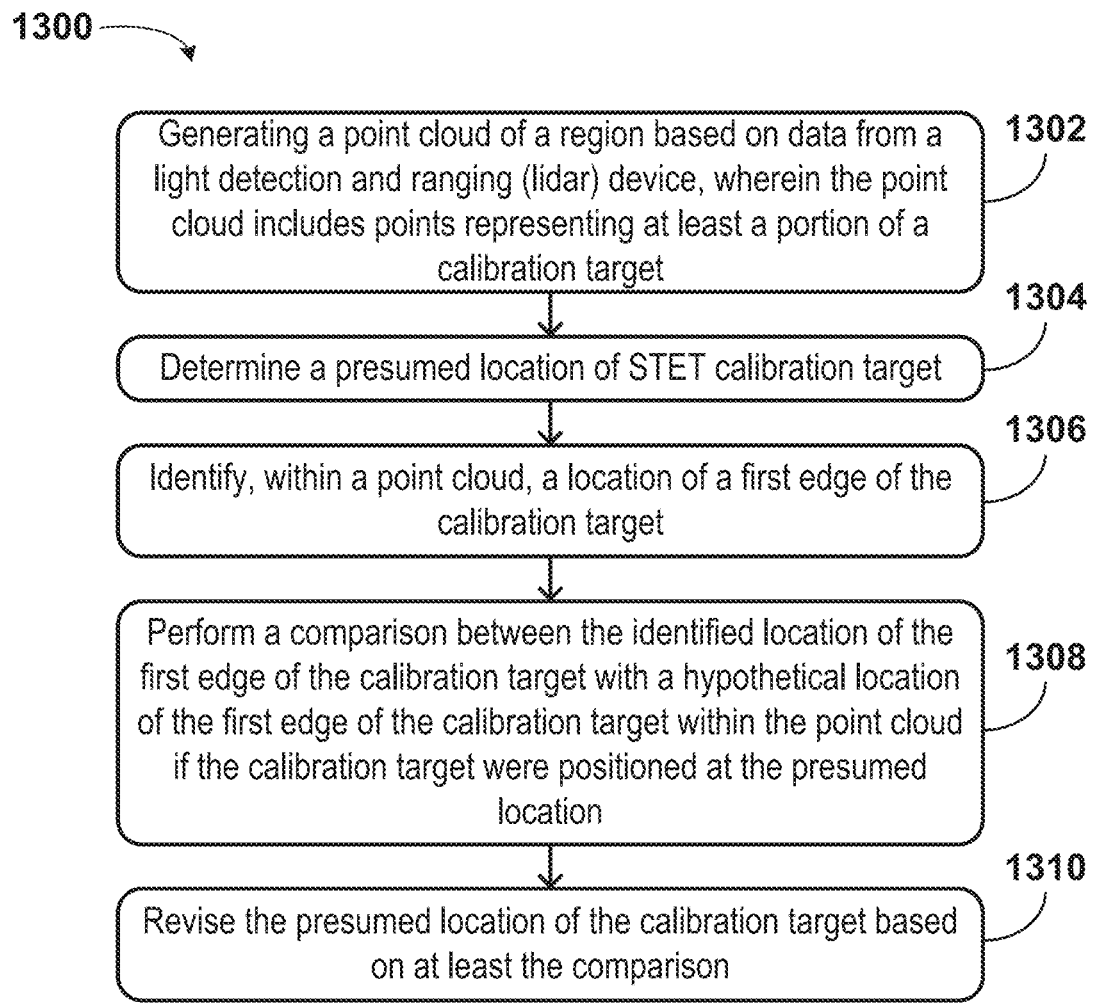
FIG. 13 is a flowchart illustration of a method, according to example embodiments.

FIG. 13 is a flowchart diagram of a method 1300, according to example embodiments. In some embodiments, the method may be performed by a processor executing instructions stored on a non-transitory, computer-readable medium. The processor may be a portion of a controller of a lidar device, a controller of a vehicle associated with a lidar device, or a fleet management server (e.g., that controls a fleet of lidar devices or a fleet of autonomous vehicles).

At block 1302, the method 1300 may include generating a point cloud of a region based on data from a light detection and ranging (lidar) device. The point cloud may include points representing at least a portion of a calibration target. The calibration target may be usable to calibrate the lidar device.

At block 1304, the method 1300 may include determining a presumed location of the calibration target.

At block 1306, the method 1300 may include identifying, within a point cloud, a location of a first edge of the calibration target.

At block 1308, the method 1300 may include performing a comparison between the identified location of the first edge of the calibration target with a hypothetical location of the first edge of the calibration target within the point cloud if the calibration target were positioned at the presumed location.

At block 1310, the method 1300 may include revising the presumed location of the calibration target based on at least the comparison.

IV. Conclusion

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims.

The above detailed description describes various features and functions of the disclosed systems, devices, and methods with reference to the accompanying figures. In the figures, similar symbols typically identify similar components, unless context dictates otherwise. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

With respect to any or all of the message flow diagrams, scenarios, and flow charts in the figures and as discussed herein, each step, block, operation, and/or communication can represent a processing of information and/or a transmission of information in accordance with example embodiments. Alternative embodiments are included within the scope of these example embodiments. In these alternative embodiments, for example, operations described as steps, blocks, transmissions, communications, requests, responses, and/or messages can be executed out of order from that shown or discussed, including substantially concurrently or in reverse order, depending on the functionality involved. Further, more or fewer blocks and/or operations can be used with any of the message flow diagrams, scenarios, and flow charts discussed herein, and these message flow diagrams, scenarios, and flow charts can be combined with one another, in part or in whole.

A step, block, or operation that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical operations or actions in the method or technique. The program code and/or related data can be stored on any type of computer-readable medium such as a storage device including random-access memory (RAM), a disk drive, a solid state drive, or another storage medium.

Moreover, a step, block, or operation that represents one or more information transmissions can correspond to information transmissions between software and/or hardware modules in the same physical device. However, other information transmissions can be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims.

What is claimed is:

1. A method comprising:
generating a point cloud of a region based on data from a light detection and ranging (lidar) device, wherein the point cloud includes points representing at least a portion of a calibration target;
determining a presumed location of the calibration target;
identifying, within the point cloud, a location of a first edge of the calibration target;
performing a comparison between the identified location of the first edge of the calibration target and a hypothetical location of the first edge of the calibration target within the point cloud if the calibration target were positioned at the presumed location;

revising the presumed location of the calibration target based on at least the comparison; and transmitting the revised presumed location of the calibration target to a fleet management server.

2. The method of claim 1, wherein determining the presumed location of the calibration target comprises:

determining, in a coordinate system of the lidar device, a presumed three-dimensional position of a center of the calibration target; and determining a presumed angular orientation of a planar surface of the calibration target relative to one or more scanning axes of the lidar.

3. The method of claim 2, wherein revising the presumed location of the calibration target comprises:

determining, in the coordinate system of the lidar device, a revised three-dimensional position of the center of the calibration target based on the comparison and a shape and size of the calibration target; and determining a revised angular orientation of the planar surface of the calibration target relative to the one or more scanning axes using points within the point cloud that are determined to have been reflected from the calibration target.

4. The method of claim 3, wherein the revised angular orientation of the planar surface of the calibration target relative to the one or more scanning axes using points within the point cloud that are deemed to have been reflected from the calibration target is determined via regression using singular value decomposition.

5. The method of claim 1, wherein the calibration target is rectangular, wherein the calibration target has a planar surface, and wherein the planar surface has approximately uniform lambertian reflectivity across the planar surface.

6. The method of claim 1, further comprising:

identifying, within the point cloud, a location of a second edge of the calibration target;

performing a further comparison between the identified location of the second edge of the calibration target and a hypothetical location of the second edge of the calibration target if the calibration target were positioned at the presumed location; and revising the presumed location of the calibration target based on at least the further comparison.

7. The method of claim 1, further comprising:

moving the lidar device relative to the calibration target;

generating, using the lidar device, an additional point cloud of an additional region that includes at least a portion of the calibration target;

identifying, within the additional point cloud, an additional location of the first edge of the calibration target;

performing an additional comparison between the identified additional location of the first edge of the calibration target and a hypothetical location of the first edge of the calibration target within the additional point cloud if the calibration target were positioned at the revised presumed location; and further revising the presumed location of the calibration target based on the additional comparison.

8. The method of claim 1, wherein identifying the location of the first edge of the calibration target comprises distinguishing a surface of the calibration target from a background, and wherein the surface of the calibration target is distinguishable from the background based on a threshold difference in reflectivity or distance between the surface of the calibration target and the background.

9. The method of claim 1, wherein the calibration target comprises one or more fiducials located thereon, and wherein the method further comprises:

capturing, using a camera associated with the lidar device, an image of the calibration target, wherein revising the presumed location of the calibration target is further based on:

positions of the one or more fiducials in the captured image; and a position and orientation of the camera relative to the lidar device.

10. The method of claim 1, wherein the presumed location comprises a geographic location of the calibration target, and wherein the geographic location is stored within a memory associated with the lidar device.

11. The method of claim 1, wherein the presumed location comprises a three-dimensional position of the calibration target in a coordinate system of the lidar device, and wherein the three-dimensional position of the calibration target is stored within a memory associated with the lidar device.

12. The method of claim 1, wherein the presumed location is transmitted to a computing device associated with the lidar device from the fleet management server or transmitted to the computing device associated with the lidar device from a computing device associated with a different lidar device.

13. The method of claim 1, further comprising storing, within a memory of the lidar device or within the memory of a fleet management server, the point cloud prior to identifying the location of the first edge of the calibration target.

14. The method of claim 1, wherein identifying the location of the first edge of the calibration target comprises assigning each point within the point cloud to one category within a group of categories, and wherein the group of categories comprises:

a first category of points to be disregarded for edge-detection, wherein the points within the first category of points correspond to:

a reflection that, had the reflection been reflected from the calibration target based on the presumed location of the calibration target, the reflection would be at an angle of incidence relative to the calibration target that is above a threshold angle of incidence; or a reflection corresponding to a distance that is more than a threshold margin closer to the lidar device than the calibration target would be if the calibration target were positioned at the presumed location;

a second category of points to be used for edge-detection, wherein the points within the second category of points correspond to:

a reflection corresponding to:

a distance that is within a threshold margin of the distance to the calibration target if the calibration target were positioned at the presumed location; and a reflectivity that is within a threshold margin of a reflectivity of the calibration target; and a third category of points to be used for edge-detection, wherein the points within the third category of points correspond to:

a reflection corresponding to a distance that is within a threshold margin of the distance to a background of the calibration target if the calibration target were positioned at the presumed location; or a reflection corresponding to a reflectivity that is within a threshold reflectivity to a background of the calibration target.

15. The method of claim 14, wherein identifying the location of the first edge of the calibration target further comprises performing edge-detection between points within the second category of points and the third category of points.

16. The method of claim 1, further comprising:
moving the lidar device relative to the calibration target;
capturing an additional point cloud of an additional region that includes at least a portion of the calibration target; and
determining whether the calibration target is identifiable within the additional point cloud.

17. The method of claim 1, further comprising determining whether the point cloud includes the at least a portion of a calibration target.

18. A non-transitory, computer-readable medium having instructions stored thereon, wherein the instructions, when executed by a processor, result in a method being performed, the method comprising:

generating a point cloud of a region based on data from a light detection and ranging (lidar) device, wherein the point cloud includes points representing at least a portion of a calibration target;
determining a presumed location of the calibration target;
identifying, within the point cloud, a location of a first edge of the calibration target;
performing a comparison between the identified location of the first edge of the calibration target with a hypothetical location of the first edge of the calibration target within the point cloud if the calibration target were positioned at the presumed location;
revising the presumed location of the calibration target based on at least the comparison; and
transmitting the revised presumed location of the calibration target to a fleet management server.

19. The method of claim 1, further comprising:
calibrating the lidar device using the calibration target.

20. The non-transitory, computer-readable medium of claim 18, wherein the method further comprises calibrating the lidar device using the calibration target.

\* \* \* \* \*